US012535967B2

(12) United States Patent
Kudo et al.

(10) Patent No.: US 12,535,967 B2

(45) Date of Patent: Jan. 27, 2026

(54) BUFFERING DEVICE AND CONTROL METHOD THEREOF

(71) Applicant: Renesas Electronics Corporation, Tokyo (JP)

(72) Inventors: Kanta Kudo, Tokyo (JP); Keiichiro Sano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 29 days.

(21) Appl. No.: 18/544,144

(22) Filed: Dec. 18, 2023

(65) Prior Publication Data

US 2024/0201895 A1 Jun. 20, 2024

(30) Foreign Application Priority Data

Dec. 19, 2022 (JP) ................................ 2022-202083

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 3/067; H04L 49/9047
See application file for complete search history.

(56) References Cited

U.S. PATENT DOCUMENTS

2005/0240745 A1* 10/2005 Iyer ..................... G06F 13/1668 711/E12.079
2013/0132682 A1* 5/2013 Kassoff ............... G06F 13/1684 711/143
2019/0205244 A1* 7/2019 Smith ..................... G06F 3/065
2023/0114493 A1* 4/2023 Kim ...................... G06F 3/0604 711/103

OTHER PUBLICATIONS

"Bridges and Bridged Networks," IEEE Standards for Local and Metropolitan Area Networks, IEEE Std 802, P197-199 Section 8.6.6-8.6.7 (1Q-2018).

* cited by examiner

*Primary Examiner* — Hosain T Alam
*Assistant Examiner* — Subir Kumar Chowdhury
(74) *Attorney, Agent, or Firm* — Rimon P.C.

(57) ABSTRACT

By a buffering device, a first holding unit holds a write number value and a read number value for each of a plurality of grouping criteria. The grouping criteria include a priority of data units as one grouping parameter. A second holding unit holds a plurality of transmission commands. The plurality of transmission commands correspond to any of the plurality of grouping criteria. A control unit forms a "holding address" for causing the second holding unit to hold the written transmission commands in the second holding unit based on the write number value for the grouping criteria corresponding to the written transmission commands. The control unit forms an "output address" of the second holding unit, in which the read transmission commands are held, based on the information on the read number value for the grouping criteria corresponding to the read transmission commands.

20 Claims, 22 Drawing Sheets

10

21-1 21-2 21-3 21-4

BUFFERING PROCESSING UNIT

HOLDING UNIT 11

HOLDING UNIT 12

HOLDING UNIT 14

CONTROL UNIT 13

10
21-4
21-3
21-2
21-1
BUFFERING PROCESSING UNIT
12
HOLDING UNIT
11
HOLDING UNIT
14
HOLDING UNIT
13
CONTROL UNIT 10
22-4
22-3
22-2
22-1
BUFFERING DEVICE
12
HOLDING UNIT
11
HOLDING UNIT
13
CONTROL UNIT

BUFFERING DEVICE AND CONTROL METHOD THEREOF

CROSS-REFERENCE TO RELATED APPLICATIONS

The present application claims priority from Japanese Patent Application No. 2022-202083 filed on Dec. 19, 2022, the content of which is hereby incorporated by reference to this application.

BACKGROUND

The present disclosure relates to a buffering device and a control method thereof.

There is a disclosed technique listed below.

[Non-Patent Document 1] IEEE802.10-2018

Non-Patent Document 1 defines, for example, a technical standard related to a frame transfer between a plurality of networks. For example, a buffering device (for example, a switch) to which a technique of Non-Patent Document 1 is applied temporarily holds frames received from a first network in a frame buffer. Then, the buffering device issues a transmission command corresponding to the frame held in the frame buffer, and holds the transmission command in a queue buffer corresponding to a destination port of the frame. The buffering device then transfers the frame corresponding to the transmission command that has its turn to be executed.

SUMMARY

The inventors have found that the technique disclosed in Non-patent Document 1 may cause capacity of the buffer for holding data units (for example, transmission commands) to become excessively large in the buffering device. Non-Patent Document 1 defines a priority given to the frame. Then, a maximum of eight levels of priority can be used. Therefore, the buffering device to which the technique of Non-Patent Document 1 is applied needs to have eight queue buffers for each destination port. For example, when 8000 frames can be held in the frame buffer, each queue buffer needs to have the capacity for holding 8000 transmission commands since there is a case where the 8000 frames correspond, as a possibility, to the same one destination port and the same one priority. Therefore, for example, when the number of destination ports is four and one transmission command is 16 bytes, it becomes 4096 kilobytes (=4 (number of ports)×8000×16×8 (number of priorities)). In this way, the capacity of the buffer that holds the transmission command becomes large.

Other problems and novel features will be apparent from the description of the present specification and the accompanying drawings.

According to one embodiment, a buffering device manages information on a write number and information on a read number for each of a plurality of grouping criteria, each of the grouping criteria including a priority of a data unit as one grouping parameter. Also, the buffering device holds the data unit in a common holding unit regardless of which grouping criterion it corresponds to. Then, the buffering device forms a holding address, which causes the holding unit to hold the written data unit, based on the information on the read number. Further, the buffering device forms an output address of the holding unit, in which the read data unit is held, based on the information on the read number.

According to one embodiment as mentioned above, the capacity of the buffer that holds the data units can be reduced in the buffering device.

DETAILED DESCRIPTION

Figure 1:
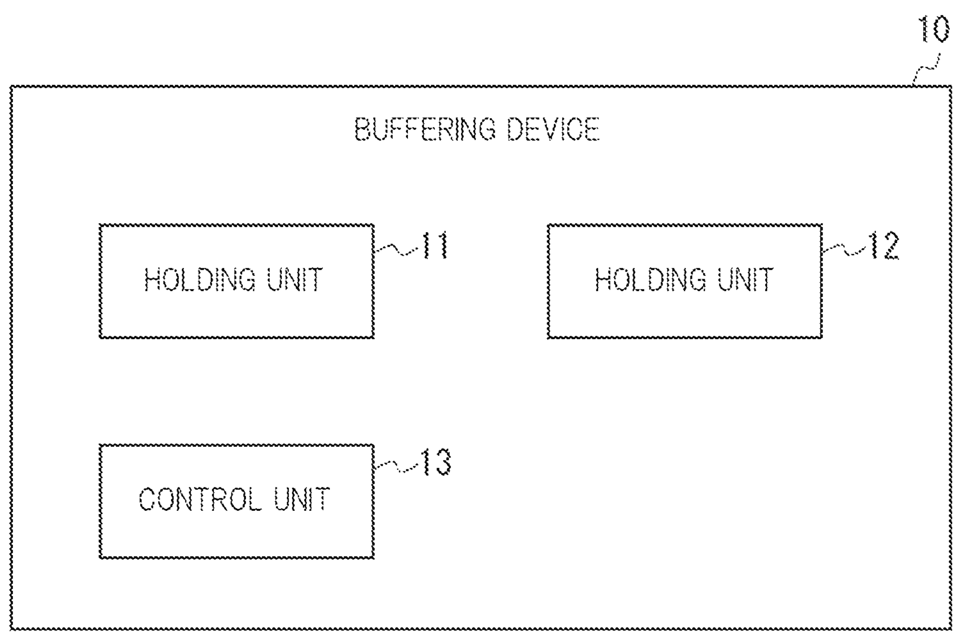
FIG. 1 is a block diagram showing a basic configuration example of a buffering device of the present disclosure.

Hereinafter, embodiments will be described with reference to the drawings. For clarity of explanation, the following descriptions and drawings are omitted and simplified appropriately. In addition, each element described in the drawings as a functional block that performs various processings can be configured by a CPU (Central Processing Unit), a memory, and other circuits in terms of hardware and be realized by a program or the like loaded in the memory. Therefore, those skilled in the art will understand that these functional blocks can be realized in various forms by the hardware only, the software only, or a combination thereof, and they are not limited to either one. Incidentally, in the respective drawings, the same elements are denoted by the same reference numerals, and a redundant description thereof will be omitted as necessary.

Also, the above-mentioned program can be stored and supplied to a computer by using various types of non-transitory computer-readable media. The non-transitory computer-readable media include various types of tangible recording media. Examples of non-transitory computer-readable media include a magnetic recording medium (for example, flexible disc, magnetic tape, hard disk drive), a magneto-optical recording medium (for example, magneto-optical disc), CD (Compact Disc)-ROM (Read Only Memory), CD-R, CD-R/W, a semiconductor memory (for example, a mask ROM, a PROM (Programmable ROM), a EPROM (Erasable PROM), a flash ROM, a RAM (Random Access Memory)). The program may also be supplied to the computer on various types of transitory computer readable media. Examples of transitory computer-readable media include an electrical signal, an optical signal, and an electromagnetic wave. The transitory computer-readable medium can supply the program to the computer via wired channels such as wires and optical fibers, or wireless channels.

Basic Configuration Example of Buffing Device of Present Disclosure

FIG. 1 is a block diagram showing a basic configuration example of a buffering device of the present disclosure. In FIG. 1, a buffering device 10 has a holding unit (first holding unit) 11, a holding unit (second holding unit) 12, and a control unit 13.

The holding unit (first holding unit) 11 holds information on a write number and information on a read number for each of a plurality of "grouping criteria". The "grouping criterion" includes a priority of a data unit as one grouping parameter. The data unit is, for example, the above-mentioned "transmission command". In the following description, it is assumed that the data unit is the transmission command, and it will be explained.

That is, the information on the write number and the information on the read number are managed for each of the grouping criteria.

The holding unit (second holding unit) 12 holds a plurality of transmission commands. The plurality of transmission commands correspond to any of the plurality of grouping criteria. That is, the transmission command is held in the holding unit 12 regardless of which grouping criterion it corresponds to. For this reason, the transmission commands for all the grouping criteria can be mixed in the holding unit 12.

Here, as described above, each transmission command corresponds to each frame temporarily held in a frame buffer (not shown). As described above, since the holding unit 12 holds the transmission command corresponding to any of the grouping criteria, the number of transmission commands capable of being held in the holding unit 12 may be equal to the number of frames capable of being held in the frame buffer (not shown). Therefore, the capacity of the holding unit 12 that holds the transmission commands can be reduced.

The control unit 13 forms a "holding address" for causing the holding unit 12 to hold the written transmission command based on information on a write number for the grouping criterion corresponding to the written transmission command. Then, the control unit 13 controls the holding unit 12 so that the holding unit 12 holds the written transmission command at a position of the holding address.

Also, the control unit 13 forms an "output address" of the holding unit 12, in which the read transmission command is held, based on information on a read number for the grouping criterion corresponding to the read transmission command. Then, the control unit 13 controls the holding unit 12 so that the holding unit 12 outputs the read transmission command held at the output address.

Then, the control unit 13 executes control for transferring the frame, which corresponds to the transmission command outputted from the holding unit 12 and is held in the frame buffer (not shown).

First Embodiment

Configuration Example of Buffering Device

Figure 2:
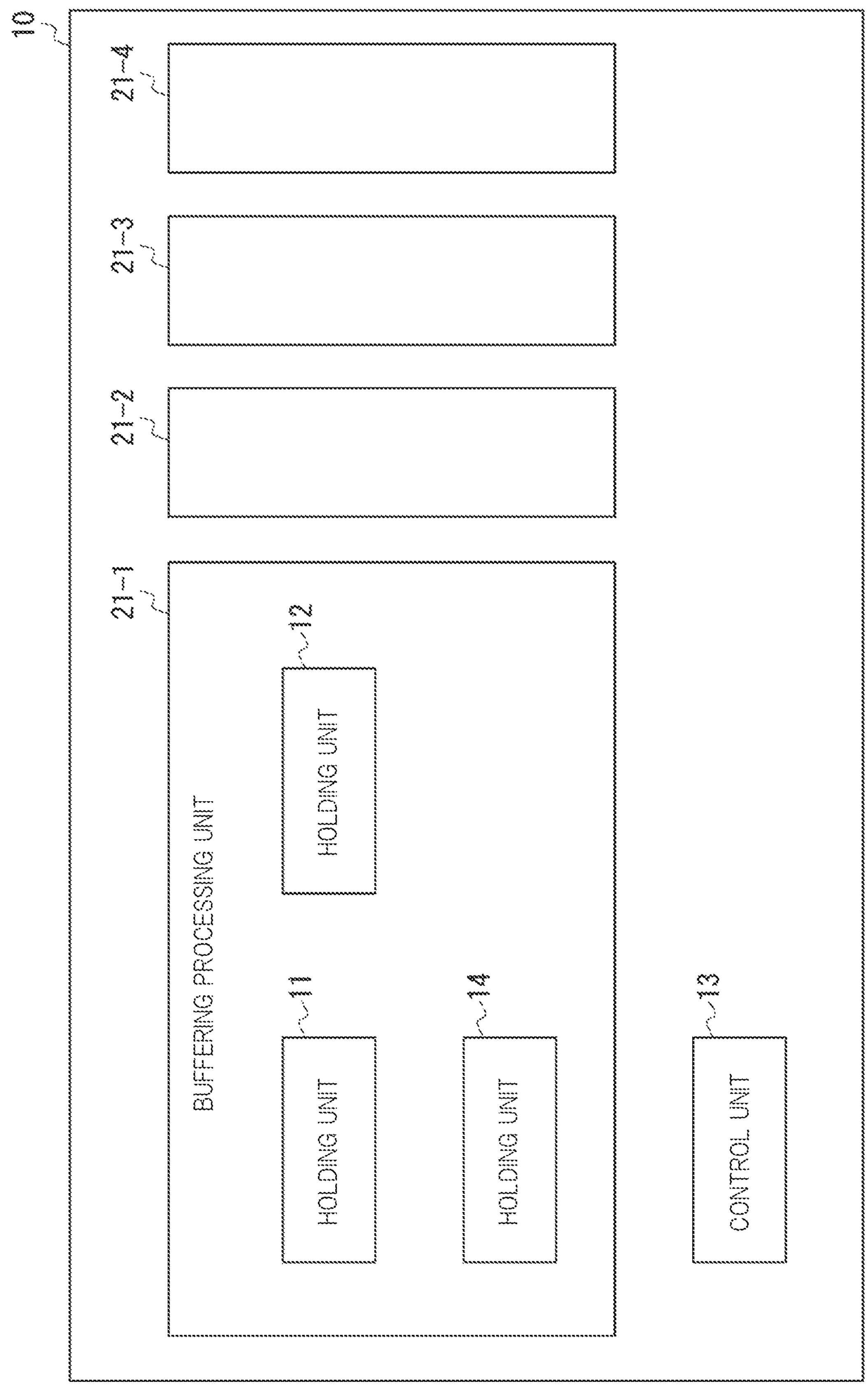
FIG. 2 is a block diagram showing one example of a buffering device according to a first embodiment.

FIG. 2 is a block diagram showing one example of a buffering device according to a first embodiment. In FIG. 2, a buffering device 10 of a first embodiment has buffering processing units 21-1 to 21-4 and the control unit 13. Hereinafter, the buffering processing units 21-1 to 21-4 may be simply referred to as a buffering processing unit 21 when they are not distinguished. Each buffering processing unit 21 corresponds to a "destination port". That is, here, as one example, a case where the number of destination ports is four is explained. Incidentally, of course, the number of destination ports (that is, the number of buffering processing units 21) included in the buffering device 10 is not limited to four, and may be any integer number equal to or greater than 1.

Each buffering processing unit 21 has the holding unit 11, the holding unit 12, and a holding unit (third holding unit) 14. The buffering processing units 21-1 to 21-4 correspond to destination ports #1 to #4, respectively.

For example, the buffering processing unit 21-1 processes the transmission command corresponding to the frame including the destination port #1 in destination information. In the buffering processing unit 21-1, the holding unit 11 holds a write number value and a read number value for each of a plurality of priorities. That is, in the first embodiment, the "grouping criterion" is the priority.

Also, in the buffering processing unit 21-1, the holding unit 12 holds all the transmission commands, which correspond to the frames including the destination port #1 in the destination information, regardless of the priority. Consequently, the number of transmission commands capable of being held in the holding unit 12 may be equal to the number of frames capable of being held in the frame buffer (not shown). Therefore, the capacity of the holding unit 12 that holds the transmission commands can be reduced.

In the buffering processing unit 21-1, the holding unit 14 holds "correspondence information (correspondence table)". The "correspondence information" includes a plurality of entries. Each entry associates an address of the holding unit 12, which holds the transmission commands, with the "priority" and a "number (storage number) value" of the transmission command. Here, the "number (storage number)" is a number assigned in order each time the transmission command is held (stored) for each priority. Then, the "number (storage number)" defines the order of reading out the transmission command among the plurality of transmission commands having the same priority. Further, each entry may also have "occupancy information". The "occupancy information" of the entry is information indicating whether the transmission command is stored at the address of the holding unit 12 of the entry. That is, the "occupancy information" of the entry can be understood as indicating whether the entry is valid, so that it may be called "valid information (valid)". For example, if a value of the "occupancy information" of the entry is "1", it indicates that the transmission command is stored at the address of the holding unit 12 of that entry. Also, if the value of "occupancy information" of the entry is "0", it indicates that no transmission command is stored at the address of the holding unit 12 of the entry. For this reason, if the plurality of addresses in the holding 12 unit are respectively inputted in advance to the plurality of entries, the control unit 13 confirms the occupation information of the entry, thereby determining whether the address of the holding unit 12 of the entry is empty.

When receiving the written transmission command, the control unit 13 of the first embodiment performs a processing for the buffering processing units 21 corresponding to the destination port of this transmission command (namely, the destination port of the frame corresponding to the transmission command). Further, the control unit 13 performs the processing for the buffering processing units 21 corresponding to the destination port of the read transmission command (namely, the destination port of the frame corresponding to the transmission command).

For example, when receiving the written transmission command for the destination port #1, the control unit 13 performs the processing for the buffering processing unit 21-1. For example, when causing the holding unit 12 to store the written transmission command, the control unit 13 refers to a write number value of the holding unit 11 corresponding to the priority of the read transmission command. Then, the control unit 13 adds, to the correspondence information of the holding unit 14, the entry that associates the address, the priority, and the number value of the holding unit 12 with respect to the written transmission command. At this time, the control unit 13 may change the value of the "occupancy information" of the added entry from "0" to "1". Further, the control unit 13 increments the write number value corresponding the priority of the written transmission command in the holding unit 11.

Also, for example, when receiving a read request for the destination port #1, the control unit 13 performs the processing for the buffering processing unit 21-1. For example, when causing the holding unit 12 to output the read transmission command, the control unit 13 refers to a read number value of the holding unit 11 corresponding to the priority of the read transmission command. Then, the control unit 13 specifies, as the above-mentioned "output address", the address of the holding unit 12 in the entry of the correspondence information corresponding to the priority and the number value of the read transmission command. Then, the control unit 13 controls the holding unit 12 so that the holding unit 12 outputs the read transmission command held at the output address. Then, the control unit 13 clears information in the entry of the correspondence information of the holding unit 14 corresponding to the priority and the number value of the read transmission command, and changes the "occupancy information" of the entry from "1" to "0". Also, the control unit 13 clears the transmission commands held at the "output address" of the holding unit 12. Then, the control unit 13 increments the read number value corresponding to the priority of the read transmission command in the holding unit 11.

Operation Example of Buffering Device

One example of a processing operation of the buffering device 10 of the first embodiment, which has the above-mentioned configuration, will be described.

<Write Processing of Transmission Command>

Figure 3:
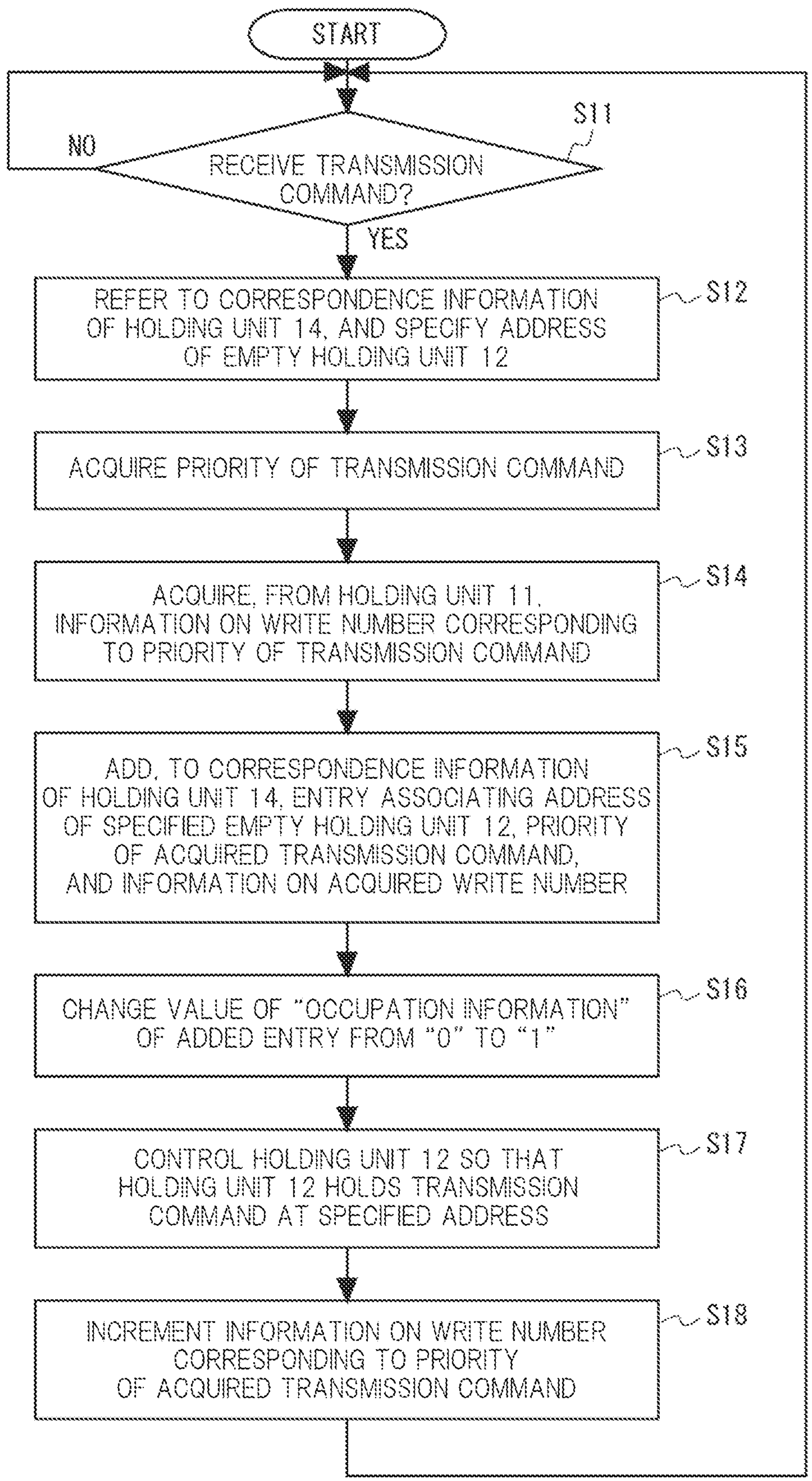
FIG. 3 is a flowchart showing a write processing of a transmission command of the buffering device according to the first embodiment.
Figure 4:
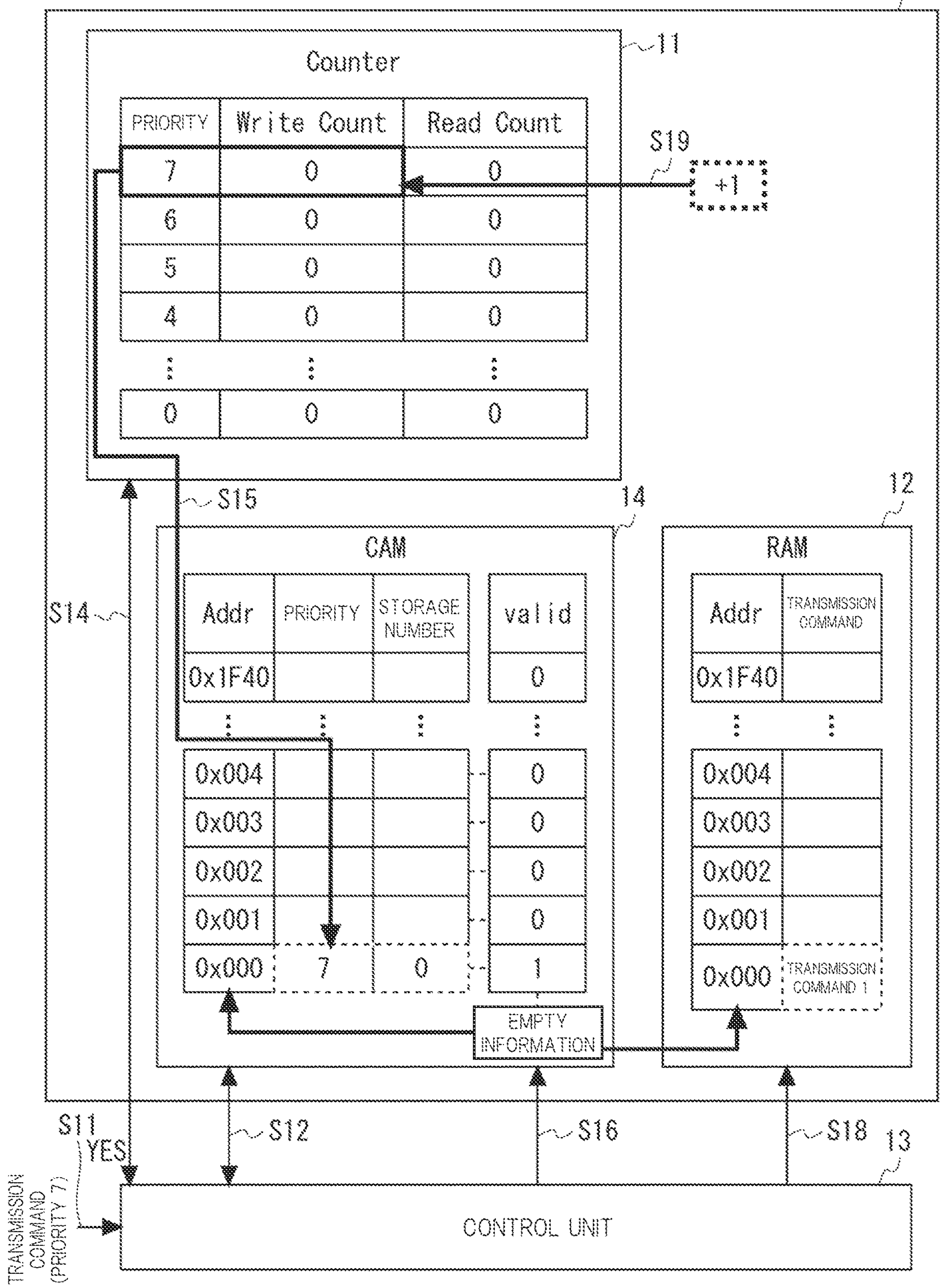
FIG. 4 is a diagram for explaining the write processing of the transmission command of the buffering device according to the first embodiment.

FIG. 3 is a flowchart showing a write processing of a transmission command of the buffering device of the first embodiment. FIG. 4 is a diagram for explaining the write processing of the transmission command of the buffering device of the first embodiment. Incidentally, the control unit 13 executes a flow of FIG. 3 for each destination port. Further, in an example of FIG. 4, the holding unit 11 is a counter, the holding unit 12 is a RAM, and the holding unit 14 is a CAM (Content Addressable Memory) or a circuit having a function equivalent to the CAM.

The control unit 13 waits to receive the transmission command corresponding to the processed destination port (step S11 NO). When receiving the transmission command corresponding to the processed destination port (step S11 YES), the control unit 13 refers to the correspondence information of the holding unit 14 in the buffering processing unit 21 corresponding to the processed destination port, and specifies the address of the empty holding unit 12 (step S12). For example, the control unit 13 refers to the correspondence information of the holding unit 14 in the buffering processing unit 21 corresponding to the processed destination port, and identifies the empty address of the holding unit 14. Then, the control unit 13 determines the specified empty address of the holding unit 14 as an address for writing it to the holding unit 12. Incidentally, if the empty address of the holding unit 14 is nothing, the control unit 13 may discard the transmission command.

The control unit 13 acquires the priority of the transmission command (step S13). Incidentally, the formation on the priority of the transmission command may be included in the transmission command.

The control unit 13 acquires the write number value (Write Count) corresponding to the acquired priority of the transmission command from the holding unit 11 (step S14). Here, since the transmission command having any priority is not held, the write number value becomes "0".

The control unit 13 adds, to the correspondence information of the holding unit 14, the entry that associates the address of the specified empty holding unit 12, the acquired priority of the transmission command, and the acquired write number value (step S15).

The control unit 13 changes the value of the "occupancy information" of the added entry from "0" to "1" (step S16).

The control unit 13 controls the holding unit 12 so that the holding unit 12 holds the transmission command at the specified address (step S17).

The control unit 13 increments the write number value corresponding to the acquired priority of the transmission command (step S18). For example, "+1" is added to the write number value "0" to update the write number value to "1".

Read Processing of Transmission Command

Figure 5:
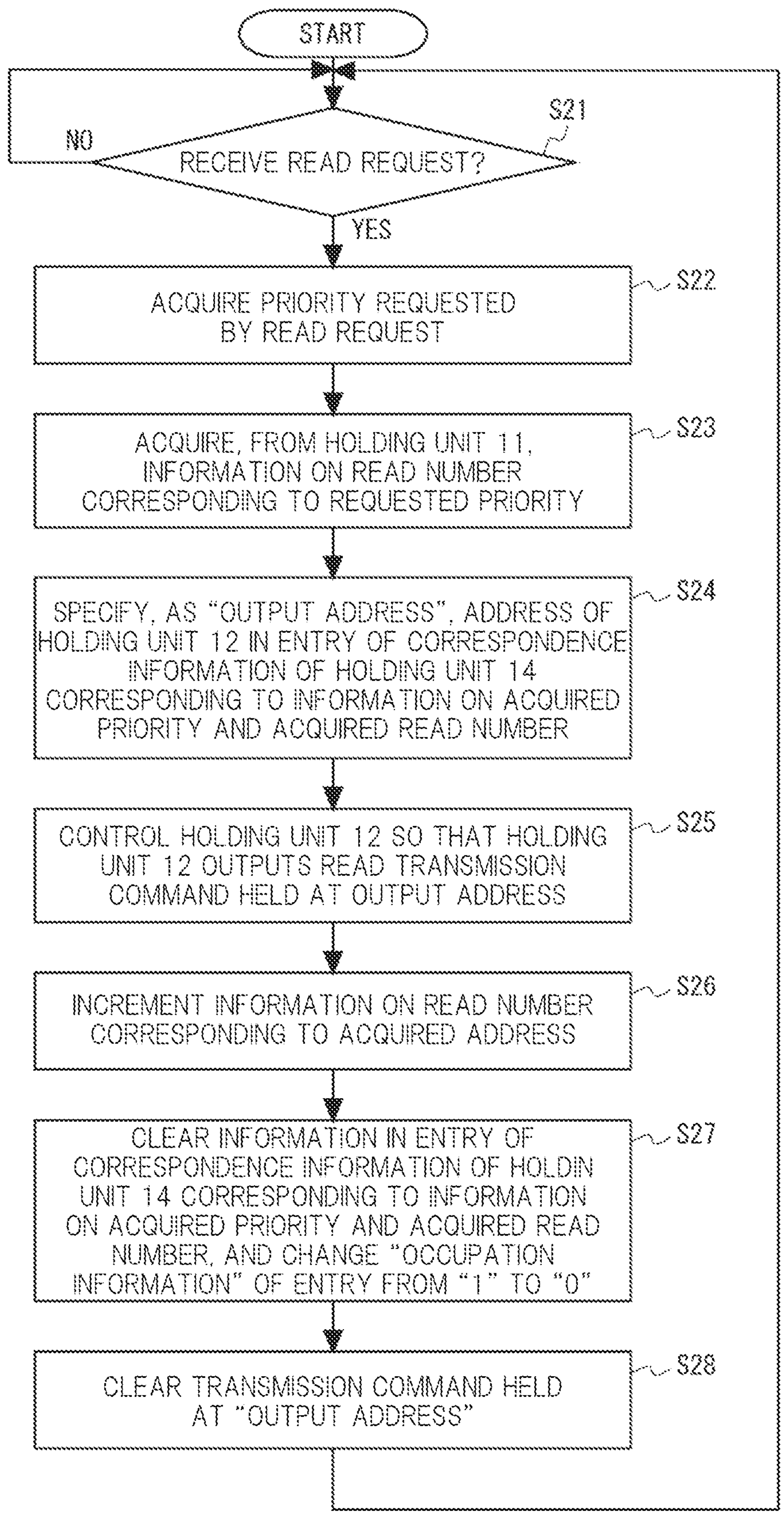
FIG. 5 is a flowchart showing a read processing of the transmission command of the buffering device according to the first embodiment.
Figure 6:
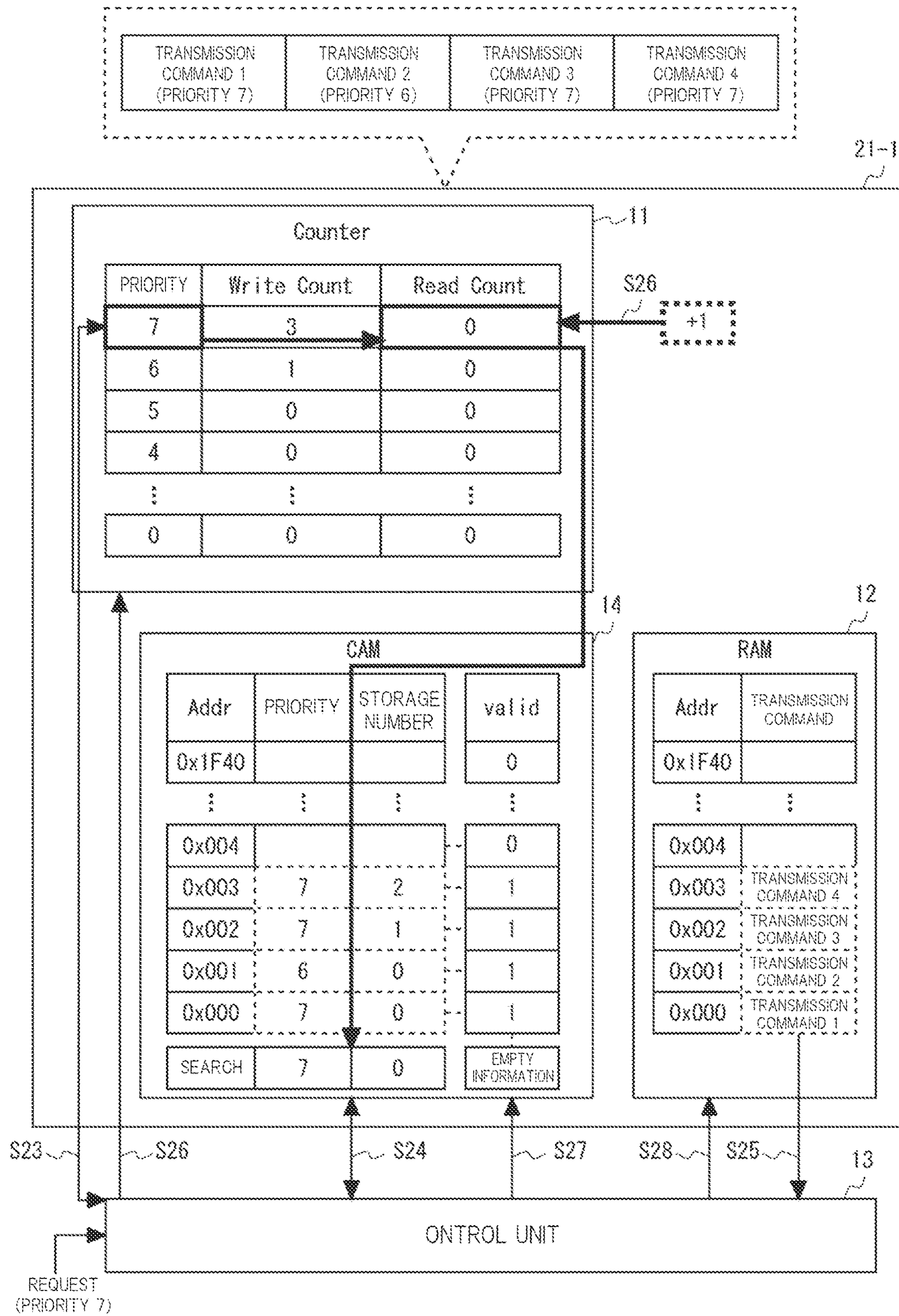
FIG. 6 is a diagram for explaining the read processing of the transmission command of the buffering device according to the first embodiment.

FIG. 5 is a flowchart showing a read processing of the transmission command of the buffering device of the first embodiment. FIG. 6 is a diagram for explaining the read processing of the transmission command of the buffering device of the first embodiment. Incidentally, the control unit 13 executes a processing flow of FIG. 5 for each destination port. Also, in an example of FIG. 6, the holding unit 11 is a counter, the holding unit 12 is a RAM, and the holding unit 14 is a CAM (Content Addressable Memory) or a circuit having a function equivalent to the CAM.

The control unit 13 waits to receive a read request corresponding to the processed destination port (step S21 NO). When receiving the read request corresponding to the processed destination port (step S21 YES), the control unit 13 acquires the priority requested by the read request (step S22). Incidentally, the formation on the priority requested by the read request may be included in the read request.

The control unit 13 acquires the read number value (Read Count) corresponding to the priority requested by the read request from the holding unit 11 (step S23).

The control unit 13 specifies, as the "output address", the address of the holding unit 12 in the entry of the correspondence information of the holding unit 14 corresponding to the acquired priority and the acquired read number value (step S24).

The control unit 13 controls the holding unit 12 so that the holding unit 12 outputs the read transmission command held at the output address (step S25).

The control unit 13 increments the read number value corresponding to the acquired priority (step S26). For example, "+1" is added to the read number value "0" to update the read number value to "1".

The control unit 13 clears the information of the entry of the correspondence information of the holding unit 14 corresponding to the acquired priority and the acquired read number value, and changes the "occupancy information" of the entry from "1" to "0" (step S27). Also, the control unit 13 clears the transmission command held at the "output address" (step S28). Incidentally, here, a case where the control unit 13 clears the transmission command held at the "output address" has been described, but the present disclosure is not limited to this. The control unit 13 may not clear the transmission command held at the "output address" but when needing to hold another transmission command at the above-mentioned address, may overwrite it with another transmission command.

Modification Example of First Embodiment

In the first embodiment described above, the "grouping criterion" is the priority. In contrast, in a modification example of the first embodiment, the "grouping criteria" are the priority and the destination port.

Figure 7:
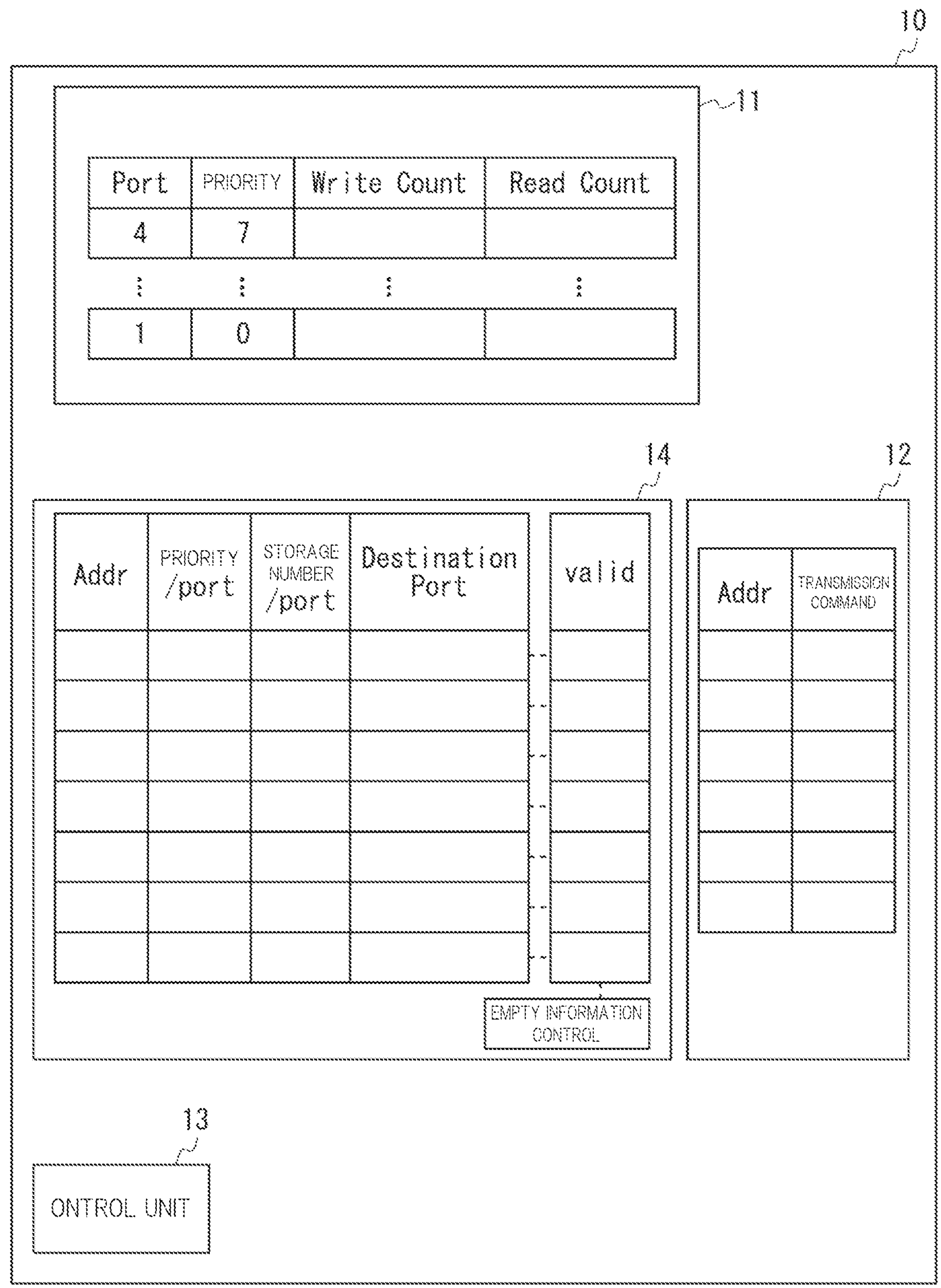
FIG. 7 is a block diagram showing one example of a buffering device according to a modification example of the first embodiment.

FIG. 7 is a block diagram showing one example of a buffering device in a modification example of the first embodiment. In FIG. 7, the buffering device 10 has the holding unit 11, the holding unit 12, a holding unit 14, and the control unit 13.

The holding unit 11 holds the write number value and the read number value for each of the plurality of combinations of the priority and the destination port. That is, in the modification example of the first embodiment, the "grouping criteria" are the priority and the destination port.

The holding unit 12 holds all of the transmission commands corresponding to the frames regardless of the combination of the priority and the destination port.

The holding unit 14 holds the "correspondence information (correspondence table)". The "correspondence information" includes the plurality of entries. Each entry associates the address of the holding unit 12, which holds the transmission command, with the "priority", the "destination port", and the "number (storage number) value" for the transmission command. Here, the "number (storage number)" is a number assigned in order each time the transmission command is held (stored) for each combination of the priority and the destination port. Then, the "number (storage number)" defines the order to read the transmission commands in the plurality of transmission commands having the combination of the same priority and destination port. Each entry may have the "occupancy information".

When causing the holding unit 12 to hold the written transmission command, the control unit 13 refers to the write number value of the holding unit 11 corresponding to the priority and the destination port for the read the transmission command. Then, the control unit 13 adds, to the correspondence information of the holding unit 14, the entry that associates the address of the holding unit 12, the priority, the destination port, and the number value with respect to the written transmission command. At this time, the control unit 13 may change the value of "occupancy information" of the added entry from "0" to "1". Further, the control unit 13 increments the write number value corresponding to the priority and the destination port of the written transmission command of the holding unit 11.

Also, when causing the holding unit 12 to output the read transmission command, the control unit 13 refers to the read number value of the holding unit 11 corresponding to the priority and the destination port of the read transmission command. Then, the control unit 13 specifies, as the "output address", the address of the holding unit 12 in the entry of the correspondence information corresponding to the priority, the destination port, and the number value of the read transmission command. Then, the control unit 13 controls the holding unit 12 so that the holding unit 12 outputs the read transmission command held at the output address. Then, the control unit 13 clears the information in the entry of the correspondence information of the holding unit 14 corresponding to the priority, the destination port, and the read number value of the read transmission command, and changes the "occupancy information" of the entry from "1" to "0". Also, the control unit 13 clears the transmission command held at the "output address" of the holding unit 12. Then, the control unit 13 increments the read number value corresponding to the priority and the destination port of the read transmission command of the holding unit 11. Incidentally, here, a case where the control unit 13 clears the transmission command held at the "output address" has been explained, but the present disclosure is not limited to this. The control unit 13 may not clear the transmission command held at the "output address" but when needing to hold another transmission command at the above-mentioned address, may overwrite it with another transmission command.

Second Embodiment

A second embodiment relates to an embodiment using a hash method.

Figure 8:
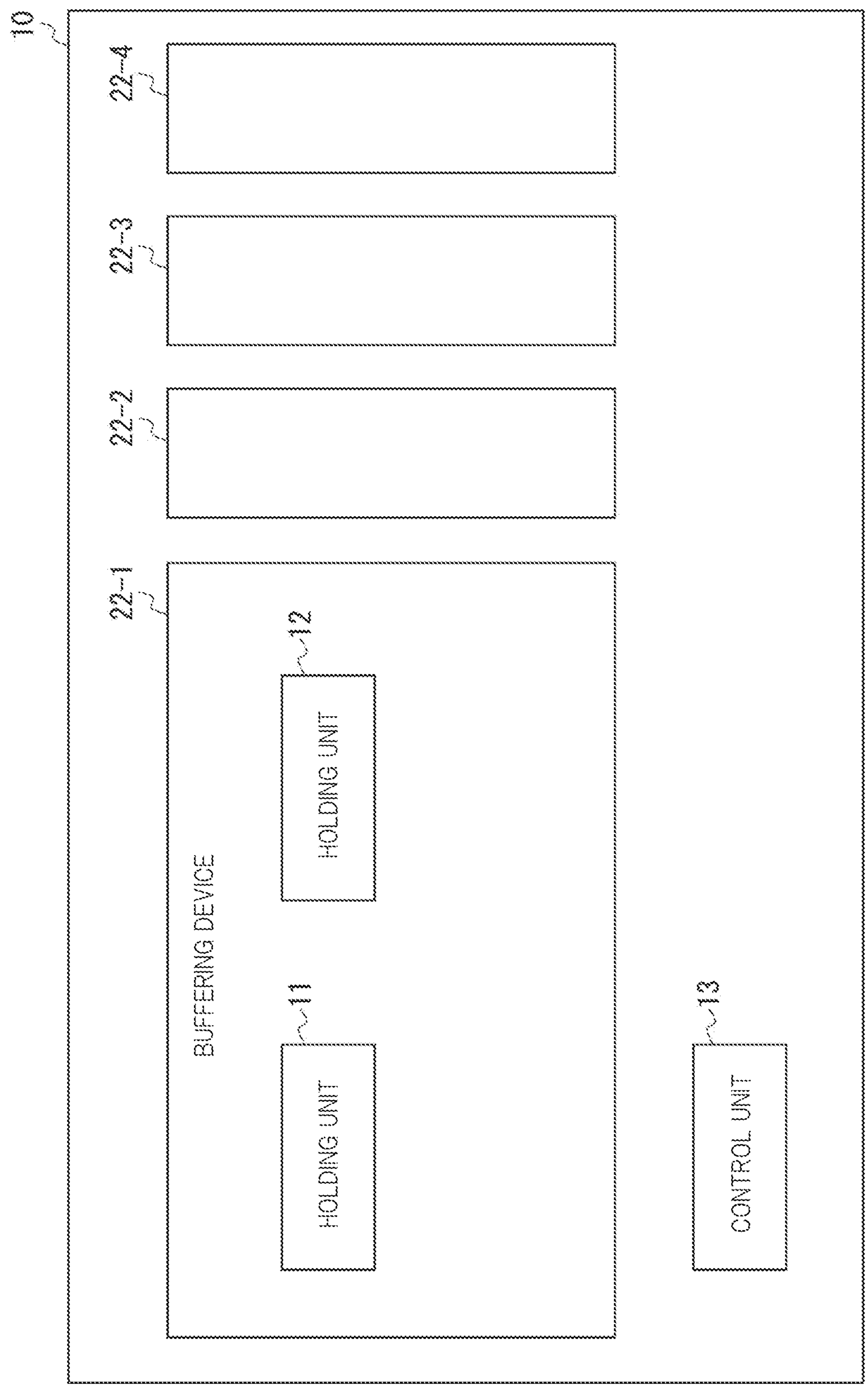
FIG. 8 is a block diagram showing one example of a buffering device according to a second embodiment.

FIG. 8 is a block diagram showing one example of a buffering device according to a second embodiment. In FIG.

8, the buffering device 10 of the second embodiment has buffering processing units 22-1 to 22-4 and the control unit 13. Hereinafter, the buffering processing units 22-1 to 22-4 may be simply referred to as a buffering processing unit 22 when not distinguished. Each buffering processing unit 22 corresponds to the "destination port". That is, here, as one example, a case where the number of destination ports is four is explained. Incidentally, of course, the number of destination ports (namely, the number of buffering processing units 22) included in the buffering device 10 is not limited to four, and may be any integer number equal to or greater than 1.

Each buffering processing unit 22 has the holding unit 11 and the holding unit 12. The buffering processing units 22-1 to 22-4 correspond to the destination ports #1 to #4, respectively.

The holding units 11 and 12 of the second embodiment are the same as the holding units 11 and 12 of the first embodiment, so that a description thereof will be omitted.

When receiving the written transmission command, the control unit 13 of the second embodiment performs a unit 22 processing for the buffering processing corresponding to the destination port of this transmission command (namely, the destination port of the frame corresponding to the transmission command). The control unit 13 also performs the processing for the buffering processing unit 22 corresponding to the destination port of the read transmission command (namely, the destination port of the frame corresponding to the transmission command).

For example, when receiving the written transmission command for the destination port #1, the control unit 13 performs the processing for the buffering processing unit 22-1. For example, when causing the holding unit 12 to hold the written transmission command, the control unit 13 refers to the write number value of the holding unit 11 corresponding to the priority of the read transmission command. Then, the control unit 13 calculates a hash value as the "holding address" based on the priority and the number value of the written transmission command. Then, the control unit 13 controls the holding unit 12 so that the holding unit 12 holds the written transmission instruction at the position of the holding address. Further, the control unit 13 increments the write number value corresponding to the priority of the written transmission command in the holding unit 11.

Also, for example, when receiving the read request for the destination port #1, the control unit 13 performs the processing for the buffering processing unit 21-1. For example, when causing the holding unit 12 to output the read transmission command, the control unit 13 of the second embodiment refers to the read number value of the holding unit 11 corresponding to the priority of the read transmission command. Then, the control unit 13 calculates the hash value as the "output address" based on the priority and the number value of the read transmission command. Then, the control unit 13 controls the holding unit 12 so that the holding unit 12 outputs the read transmission command held at the output address. Then, the control unit 13 increments the read number value corresponding to the priority of the read transmission command in the holding unit 11. Then, the control unit 13 clears the transmission command held at the "output address" of the holding unit 12. Incidentally, here, a case where the control unit 13 clears the transmission command held at the "output address" has been explained, but the present disclosure is not limited to this. The control unit 13 may not clear the transmission command held at the "output address" but when needing to hold another transmission command at the above-mentioned address, may overwrite it with another transmission command.

Here, the control unit 13 generates the hash value by applying a specific algorithm or function to the priority and the number value of the read transmission command. A known technique such as CRC, ZIP, or SHA can be used as the algorithm or function for generating the hash value.

Modification Example of Second Embodiment

In the second embodiment described above, the "grouping criterion" is the priority. In contrast, in a modification example of the second embodiment, the "grouping criteria" are the priority and the destination port.

Figure 9:
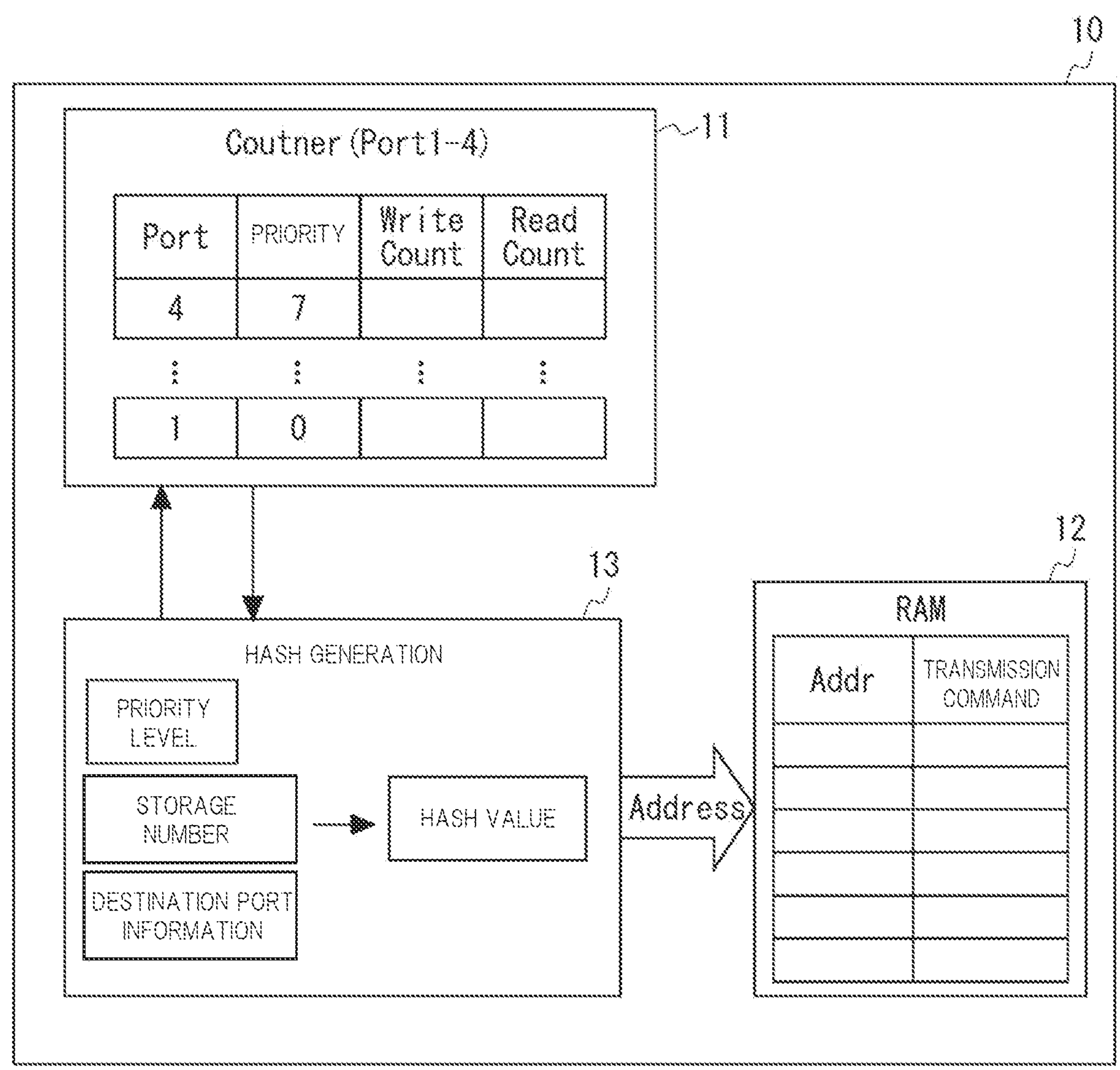
FIG. 9 is a block diagram showing one example of a buffering device according to a modification example of the second embodiment.

FIG. 9 is a block diagram showing one example of a buffering device in a modification example of the second embodiment. In FIG. 9, the buffering device 10 has the holding unit 11, the holding unit 12, and the control unit 13.

As in the modification example of the first embodiment, the holding unit 11 of the modification example of the second embodiment holds the write number value and the read number value for each of the plurality of combinations of the priorities and the destination ports. Also, the holding unit 12 of the modification example of the second embodiment holds all of the transmission commands corresponding to the frames regardless of the combination of the priority and the destination port.

When causing the holding unit 12 to hold the read transmission command, the control unit 13 of the modification example of the second embodiment refers to the write number value of the holding unit 11 corresponding to the priority and the destination port of the read transmission command. Then, the control unit 13 calculates the hash value as the "holding address" based on the priority, the destination port, and the number value of the written transmission command. Then, the control unit 13 controls the holding unit 12 so that the holding unit 12 holds the written transmission instruction at the position of the holding address. Further, the control unit 13 increments the write number value corresponding to the priority and the destination port of the written transmission command of the holding unit 11.

Further, when causing the holding unit 12 to output the read transmission command, the control unit 13 of the modification example of the second embodiment refers to the the unit read transmission command in holding 11 corresponding to the priority and the destination port of the read transmission command. Then, the control unit 13 calculates the hash value as the "output address" based on the priority, the destination port, and the number value of the read transmission command. Then, the control unit 13 controls the holding unit 12 so that the holding unit 12 outputs the read transmission command held at the output address. Then, the control unit 13 increments the read number value corresponding to the priority and the destination port of the read transmission command in the holding unit 11. Then, the control unit 13 clears the transmission command held at the "output address" of the holding unit 12.

Third Embodiment

A third embodiment relates to an embodiment using a link structure. Incidentally, a configuration of a buffering device of the third embodiment is the same as that of the buffering device 10 of the first embodiment, so that FIG. 2 will be referred to.

Configuration Example of Buffering Device

The holding units 11 and 12 of each buffering processing unit 21 of the third embodiment are the same as the holding units 11 and d 12 of the first embodiment. However, in the holding unit 11 of the third embodiment, the address itself of the holding unit 12 is used for each of the write number value and the read number value.

The holding unit 14 of each buffering processing unit 21 of the third embodiment holds the "correspondence information (correspondence table)". The "correspondence information" includes the plurality of entries. Each entry associates the address of the holding unit 12, in which the transmission command is held, "occupancy information (storage status information)", and "next address (link information)". The "occupancy information (storage status information)" indicates whether the transmission command is held at the address of the holding unit 12 or is reserved. For example, if a value of the "occupancy information" of the entry is "1", it indicates that the transmission command is held at the address of the holding unit 12 of the above-mentioned entry or is reserved. Also, if the value of the "occupancy information" of the entry is "0", it indicates that no transmission command is stored at the address of the holding unit 12 of the above-mentioned entry or is reserved. For this reason, if the plurality of addresses of the holding unit 12 are respectively inputted in advance to the plurality of entries, the control unit 13 determines whether the address of the holding unit 12 of the entry is empty (unused) by confirming the occupation information of the entry. Further, the "next address" is an address of the holding unit 12 that holds a transmission command next to the above-mentioned transmission command with respect to the priority of the transmission command held at the address of the holding unit 12.

When receiving the written transmission command, the control unit 13 of the third embodiment performs the processing for the buffering processing unit 21 corresponding to the destination port of this transmission command (namely, the destination port of the frame corresponding to the transmission command). Further, the control unit 13 performs the processing for the buffering processing unit 21 corresponding to the destination port of the read transmission command (namely, the destination port of the frame corresponding to the transmission command).

For example, when receiving the written transmission command for the destination port #1, the control unit 13 performs the processing for the buffering processing unit 21-1. For example, when causing the holding unit 12 to hold the written transmission command, the control unit 13 refers to the write number value of the holding unit 11 corresponding to the priority of the read transmission command. Then, the control unit 13 causes the address of the holding unit 12, which is based on the write number value corresponding to the priority of the written transmission command, to hold the written transmission command. Then, the control unit 13 acquires the unused address of the holding unit 12, which does not hold any transmission command and is not reserved, from the correspondence information. Here, the unused address is, for example, the address of the holding unit 12 of the entry in which the value of the occupation information is "0".

Then, the control unit 13 inputs the acquired unused address to the "next address" of the entry of the correspondence information corresponding to the address of the holding unit 12 in which the written transmission command is held. Then, the control unit 13 overwrites, by the acquired unused address, the write number value corresponding to the priority of the written transmission command in the holding unit 11. Then, the control unit 13 updates the occupation information of the entry of the correspondence information corresponding to the acquired unused address to a value indicating whether the transmission command is held or a reservation is made.

Also, for example, when receiving the read request for the destination port #1, the control unit 13 performs the processing for the buffering processing unit 21-1. For example, when causing the holding unit 12 to output the read transmission command, the control unit 13 refers to the read number value of the holding unit 11 corresponding to the priority of the read transmission command. Then, the control unit 13 controls the holding unit 12 so that the holding unit 12 outputs the read transmission command from the address of the holding unit 12 based on the read number value corresponding to the priority of the read transmission command. Then, the control unit 13 updates the read number value corresponding to the priority of the read transmission command in the holding unit 11 by the "next address" in the entry of the correspondence information corresponding to the address of the holding unit 12 of the outputted read transmission command. Then, the control unit 13 updates, to a value indicating empty (unused), the occupation information in the entry of the correspondence information corresponding to the address of the holding unit 12 of the outputted read transmission command. Also, the control unit 13 clears the transmission command outputted from the holding unit 12. Incidentally, here, a case where the control unit 13 clears the transmission command outputted from the holding unit 12 has been explained, but the present disclosure is not limited to this. The control unit 13 may not clear the transmission command outputted from the holding unit 12 but when needing to hold another transmission command at the above-mentioned address, may overwrite it with another transmission command.

Operation Example of Buffering Device

One example of a processing operation of the buffering device 10 according to the third embodiment, which has the above-mentioned configuration, will be described.

Write Processing of Transmission Command

Figure 10:
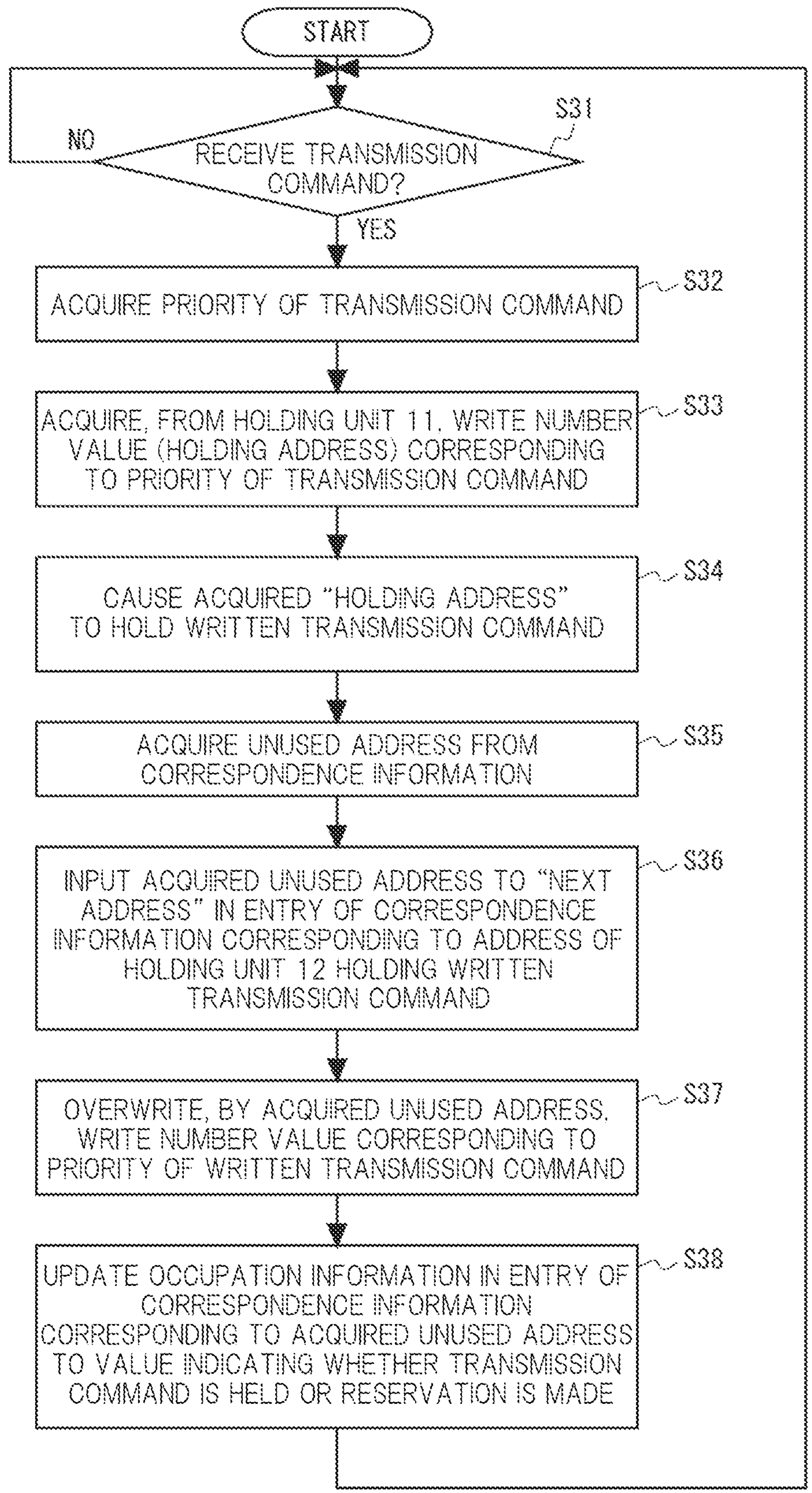
FIG. 10 is a flowchart showing a write processing of a transmission command of a buffering device according to a third embodiment.
Figure 11:
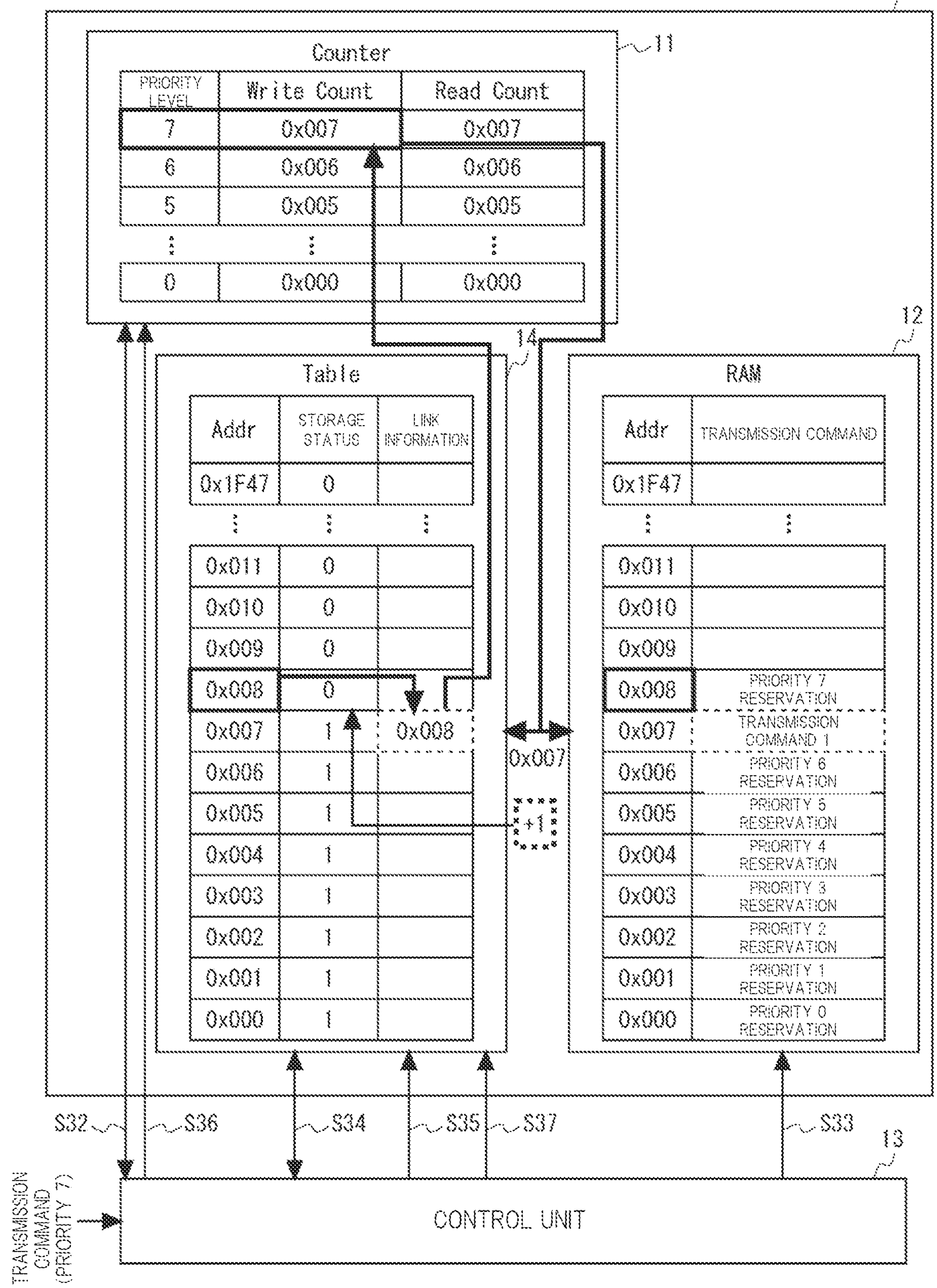
FIG. 11 is a diagram for explaining the write processing of the transmission command of the buffering device according to the third embodiment.

FIG. 10 is a flowchart showing a write processing of the transmission command of the buffering device according to the third embodiment. FIG. 11 is a diagram for explaining the write processing of the transmission command of the buffering device according to the third embodiment. Incidentally, the control unit 13 executes a processing flow of FIG. 10 for each destination port. Further, in an example of FIG. 11, the holding unit 11 is the counter, the holding unit 12 is the RAM, and the holding unit 14 holds a table.

First, before starting the processing flow of FIG. 10, the control unit 13 reserves an address of one holding unit 12 for each of eight priorities. Then, the control unit 13 updates, by the reserved address, the write number value and the read number value of each of the eight priorities in the holding unit 11. For example, as shown in FIG. 11, the control unit 13 reserves addresses "0x000" to "0x007" of the holding unit 12 for priority 0 to 7, respectively.

The control unit 13 waits to receive the transmission command corresponding to the processed destination port (step S31 NO). When receiving the transmission command corresponding to the processed destination port (step S31 YES), the control unit 13 acquires the priority of the transmission command (step S32). Incidentally, the information on the priority of the transmission command may be included in the transmission command.

The control unit 13 acquires, from the holding unit 11, the write number value (holding address) corresponding to the acquired priority of the transmission command (step S33).

The control unit 13 controls the holding unit 12 to cause the acquired "holding address" to hold the written transmission command (step S34).

The control unit 13 acquires the unused address of the holding unit 12, which does not hold any transmission command and whose reservation is not made, from the correspondence information (step S35).

The control unit 13 inputs the acquired unused address to the "next address" in the entry of the correspondence information corresponding to the address of the holding unit 12 in which the written transmission command is held (step S36).

The control unit 13 overwrites, by the acquired unused address, the write number value corresponding to the priority of the written transmission command in the holding unit 11 (step S37).

The control unit 13 updates the occupation information in the entry of the correspondence information corresponding to the acquired unused address to the value indicating whether the transmission command is held or the reservation is made (step S38).

Read Processing of Transmission Command

Figure 12:
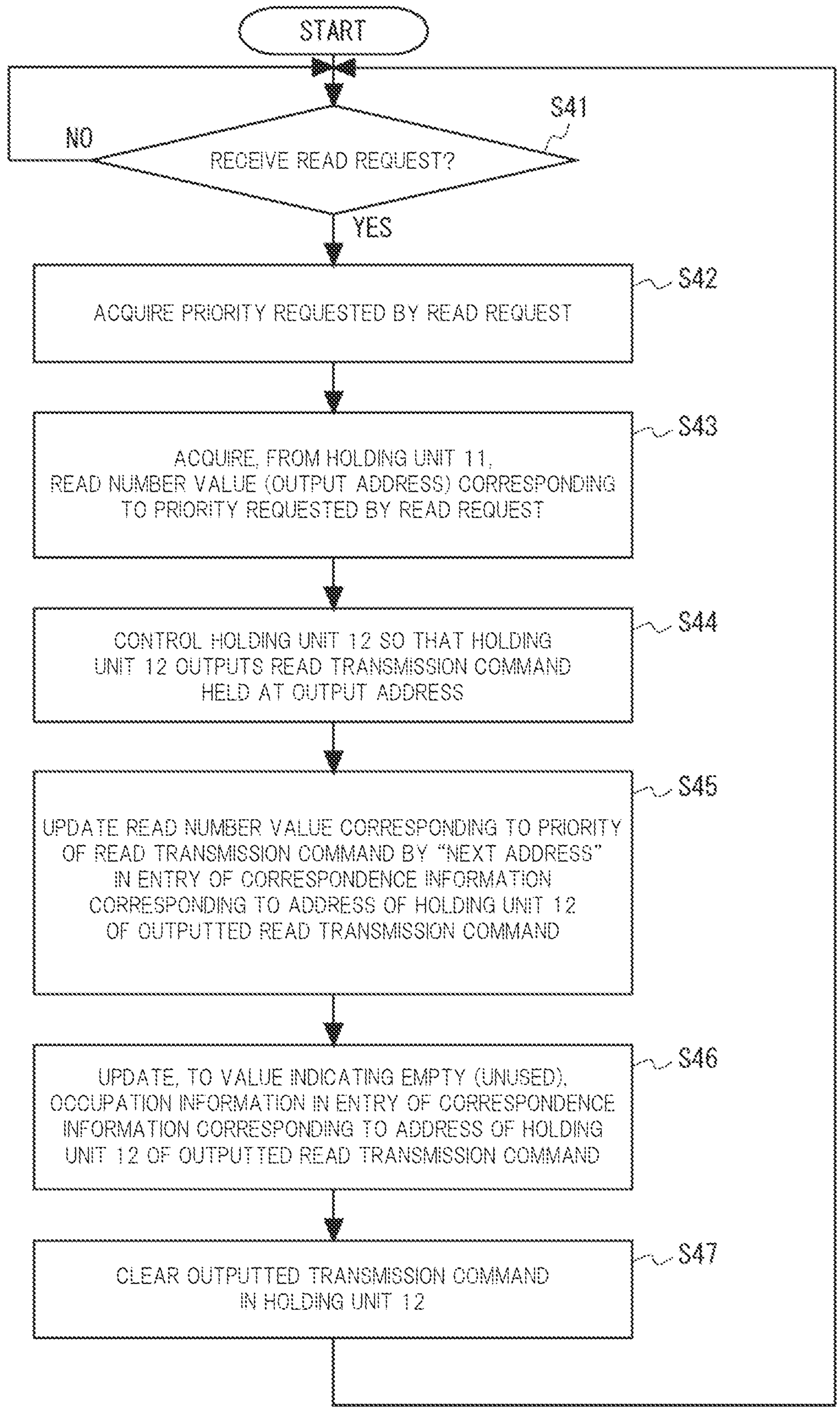
FIG. 12 is a flowchart showing a read processing of the transmission command of the buffering device according to the third embodiment.
Figure 13:
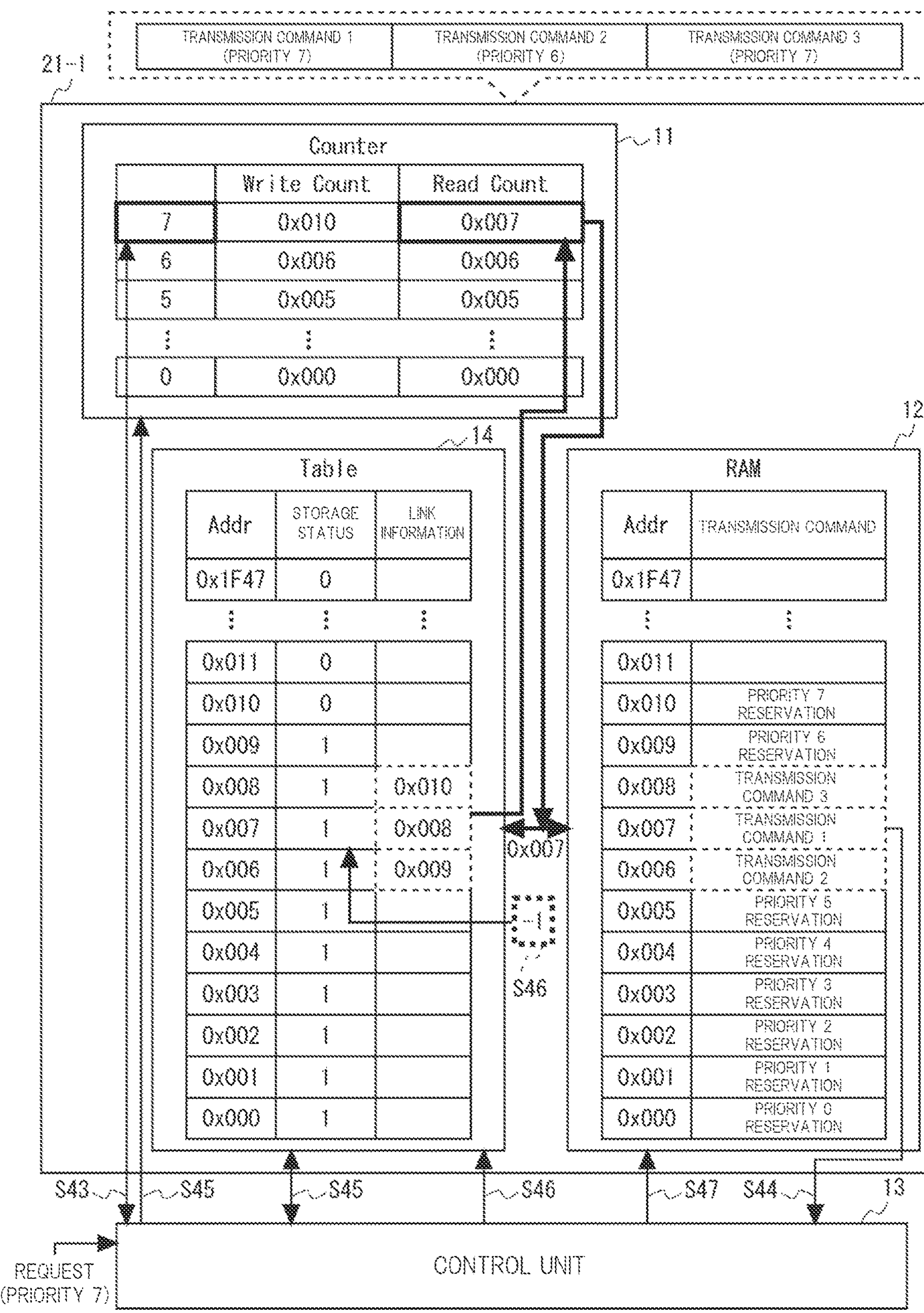
FIG. 13 is a diagram for explaining the read processing of the transmission command of the buffering device according to the third embodiment.

FIG. 12 is a flowchart showing a read processing of the transmission command of the buffering device according to the third embodiment. FIG. 13 is a diagram for explaining the read processing of the transmission command of the buffering device according to the third embodiment. Incidentally, the control unit 13 executes a processing flow of FIG. 12 for each destination port. Further, in an example of FIG. 13, the holding unit 11 is the counter, the holding unit 12 holds the RAM, and the holding unit 14 is the table.

The control unit 13 waits to receive the read request corresponding to the processed destination port (step S41 NO). When receiving the read request corresponding to the processed destination port (step S41 YES), the control unit 13 acquires the priority requested by the read request (step S42). Incidentally, the information on the priority requested by the read request may be included in the read request.

The control unit 13 acquires, from the holding unit 11, the read number value (output address) corresponding to the priority requested by the read request (step S43).

The control unit 13 controls the holding unit 12 so that the holding unit 12 outputs the read transmission command held at the output address (step S44).

The control unit 13 updates the read number value corresponding to the priority of the read transmission command in the holding unit 11 by the "next address" in the entry of the correspondence information corresponding to the address of the holding unit 12 of the outputted read transmission command (step S45).

The control unit 13 updates, to the value indicating empty (unused), the occupation information in the entry of the correspondence information corresponding to the address of the holding unit 12 of the outputted read transmission command (step S46).

The control unit 13 clears the transmission command outputted from the holding unit 12 (step S47). Incidentally, here, a case where the control unit 13 clears the transmission command outputted from the holding unit 12 has been explained, but the present disclosure is not limited to this. The control unit 13 may not clear the transmission command outputted from the holding unit 12 but when needing to hold another transmission command at the above-mentioned address, may overwrite it with another transmission command.

Modification Example of Third Embodiment

In the third embodiment described above, the "grouping criterion" is the priority. In contrast, in a modification example of the third embodiment, the "grouping criteria" are the priority and the destination port.

Figure 14:
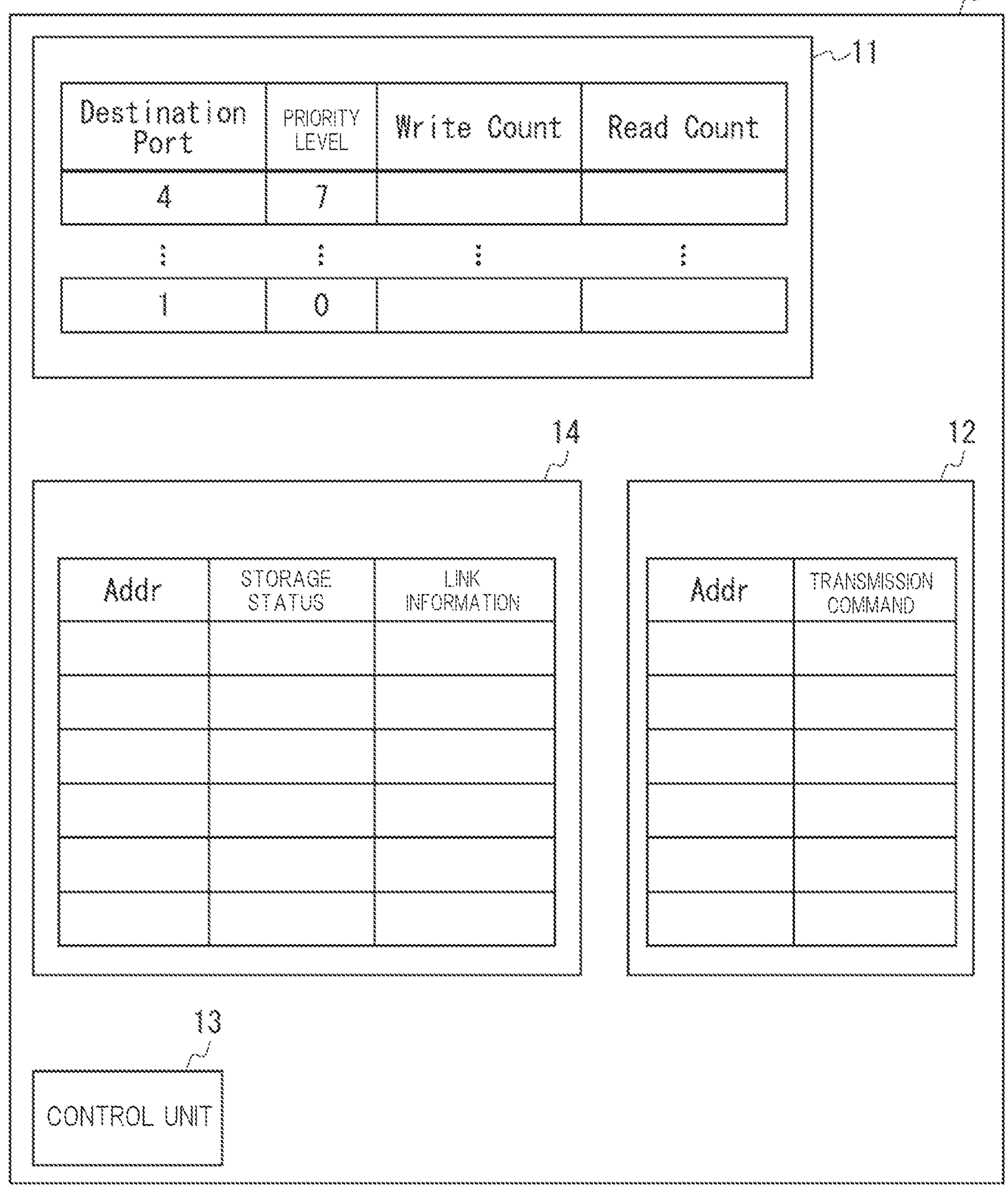
FIG. 14 is a block diagram showing one example of a buffering device according to a modification example of the third embodiment.

FIG. 14 is a block diagram showing one example of a buffering device according to a modification example of the third embodiment. In FIG. 14, the buffering device 10 has the holding unit 11, the holding unit 12, the holding unit 14, and the control unit 13.

The holding unit 11 holds the write number value and the read number value for each of the plurality of combinations of the priorities and the destination ports. That is, in the modification example of the third embodiment, the "grouping criteria" are the priority and the destination port. In addition, in the modification example of the third embodiment, the address itself of the holding unit 12 is used for each of the write number value and the read number value.

The holding unit 12 holds all of the transmission commands corresponding to the frames regardless of the combination of the priority and the destination port.

The holding unit 14 holds the "correspondence information (correspondence table)". The "correspondence information" includes the plurality of entries. Each entry associates the address of the holding unit 12 in which the transmission command is held, the "occupancy information (storage status information)", and the "next address (link information)". The "next address" is the address of the holding unit 12 in which, for the combination of the priority and the destination port of the transmission command held in the address of the holding unit 12, the transmission command subsequent to the above-mentioned transmission command is held.

When causing the holding unit 12 to hold the written transmission command, the control unit 13 refers to the write number value of the holding unit 11 corresponding to the combination of the priority and the destination port of the read transmission command. Then, the control unit 13 causes the address of the holding unit 12, which is based on the write number value corresponding to the combination of the priority and the destination port of the written transmission command, to hold the written transmission command. Then, the control unit 13 acquires the unused address of the holding unit 12, in which any transmission command is not held and which is not reserved, from the correspondence information.

Then, the control unit 13 inputs the acquired unused address to the "next address" in the entry of the correspondence information corresponding to the address of the holding unit 12 in which the written transmission command is held. Then, the control unit 13 overwrites, by the acquired unused address, the write number value corresponding to the combination of the priority and the destination port of the written transmission command in the holding unit 11. Then, the control unit 13 updates, to the value indicating whether the transmission command is held or the reservation is made, the occupation information in the entry of the correspondence information corresponding to the acquired unused address.

Further, when causing the holding unit 12 to output the read transmission command, the control unit 13 refers to the read number value of the holding unit 11 corresponding to the combination of the priority and the destination port of the read transmission command. Then, the control unit 13 controls the holding unit 12 so that the holding unit 12 outputs the read transmission command from the address of the holding unit 12 based on the read number value corresponding to the combination of the priority and destination port of the read transmission command. Then, the control unit 13 updates the read number value corresponding to the combination of the priority and the destination port of the written transmission command in the holding unit 11 by the "next address" in the entry of the correspondence information corresponding to the address of the holding unit 12 of the outputted read transmission command. Then, the control unit 13 updates, to the value indicating empty (unused), the occupation information in the entry of the correspondence information corresponding to the address of the holding unit 12 of the outputted read transmission command. Also, the control unit 13 clears the transmission command outputted from the holding unit 12.

Fourth Embodiment

A fourth embodiment relates to an embodiment using a first-in first-out unit (FIFO).

Configuration Example of Buffering Device

Figure 15:
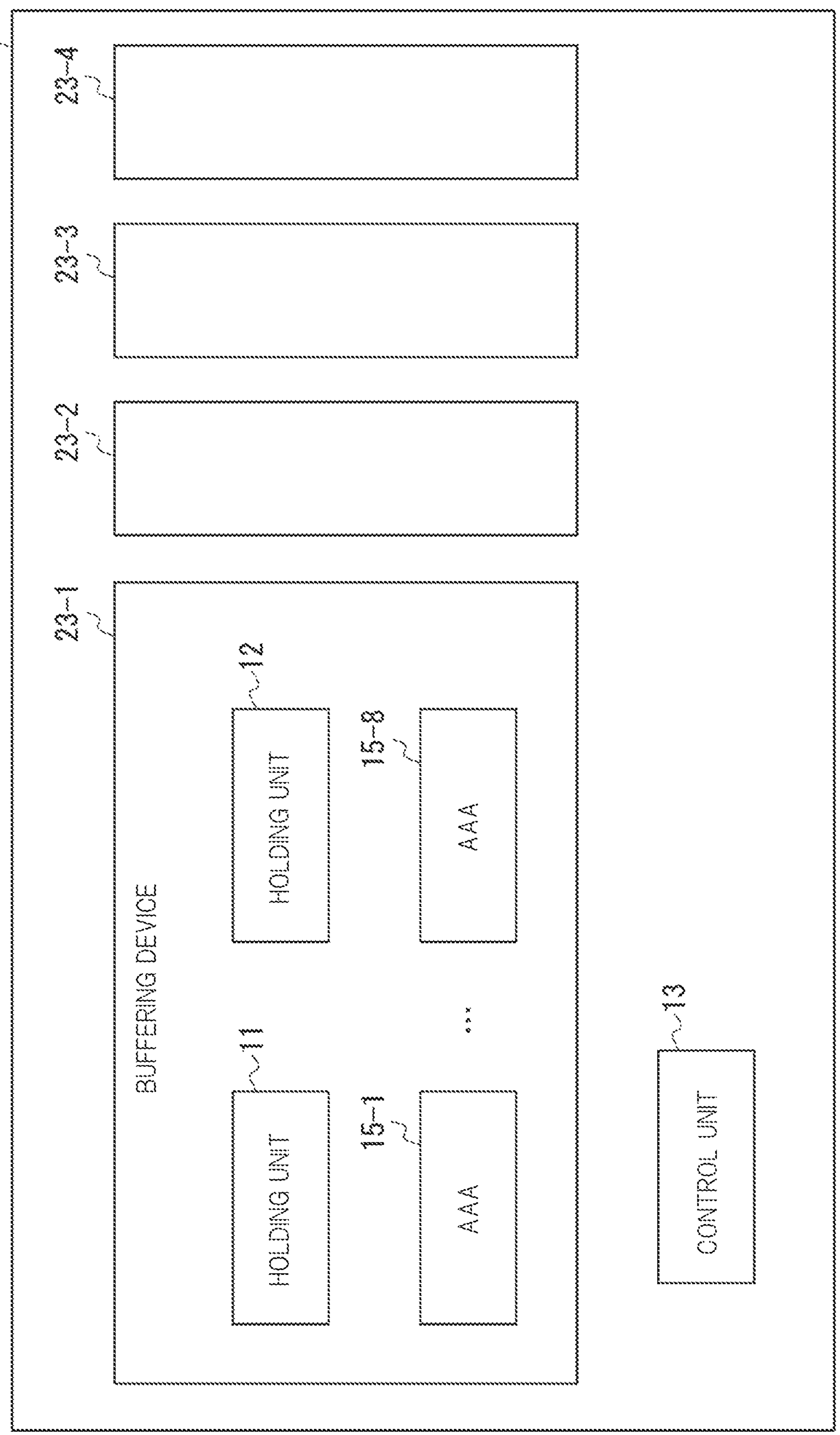
FIG. 15 is a block diagram showing one example of a buffering device according to a fourth embodiment.

FIG. 15 is a block diagram showing one example of a buffering device according to a fourth embodiment. In FIG. 15, the buffering device 10 of the fourth embodiment has buffering processing units 23-1 to 23-4 and the control unit 13. Hereinafter, the buffering processing units 23-1 to 23-4 may be simply referred to as a buffering processing unit 23 when they are not distinguished. Each buffering processing unit 23 corresponds to the "destination port". That is, here, as one example, a case where the number of destination ports is four is explained. Incidentally, of course, the number of destination ports (namely, the number of buffering processing units 23) included in the buffering device 10 is not limited to four, and may be any integer number equal to or greater than 1.

Each buffering processing unit 23 has the holding unit 11, the holding unit 12, and first-in first-out units 15-1 to 15-8. The buffering processing units 23-1 to 23-4 correspond to the destination ports #1 to #4, respectively. Further, the first-in first-out units 15-1 to 15-8 correspond to priority 0 to 7, respectively.

The holding units 11 and 12 of each buffering processing unit 21 of the fourth embodiment are the same as the holding units 11 and 12 of the first embodiment. However, in the holding unit 11 of the fourth embodiment, with respect to each of the write number value and the read number value for a certain priority, for example, an address itself in the first-in first-out unit 15 corresponding to the above-mentioned priority is used.

When receiving the written transmission command, the control unit 13 of the fourth embodiment performs a processing for buffering the processing unit 23 corresponding to the destination port of this transmission command (namely, the destination port of the frame corresponding to the transmission command). The control unit 13 also performs the processing for the buffering processing unit 23 corresponding to the destination port of the read transmission command (namely, the destination port of the frame corresponding to the transmission command).

For example, when receiving the written transmission command for the destination port #1, the control unit 13 performs the processing for the buffering processing unit 23-1. For example, when causing the holding unit 12 to hold the written transmission command, the control unit 13 acquires the write number value corresponding to the priority of the written transmission command in the holding unit 11. Then, the control unit 13 causes the position (address), which the acquired write number value of the first-in first-on unit 15 corresponding to the priority of the written transmission command indicates, to hold the acquired address of the holding unit 12. Then, the control unit 13 increments the write number value corresponding to the priority of the written transmission command in the holding unit 11.

Also, for example, when receiving the read request of the destination port #1, the control unit 13 performs the processing for the buffering processing unit 21-1. For example, when causing the holding unit 12 to output the read transmission command, the control unit 13 acquires the read number value corresponding to the priority of the read transmission command in the holding unit 11. Then, the control unit 13 acquires the address of the holding unit 12 held at the position which the acquired read number value of the first-in first-out unit 15 corresponding to the priority of the read transmission command indicates. Then, the control unit 13 controls the holding unit 12 so as to output the read transmission command held at the acquired address of the holding unit 12. Then, the control unit 13 clears the outputted transmission command from the holding unit 12. Then, the control unit 13 increments the read number value corresponding to the priority of the read transmission command in the holding unit 11.

Operation Example of Buffering Device

One example of the processing operation of the buffering device 10 according to the fourth embodiment, which has the above-mentioned configuration, will be described.

Write Processing of Transmission Command

Figure 16:
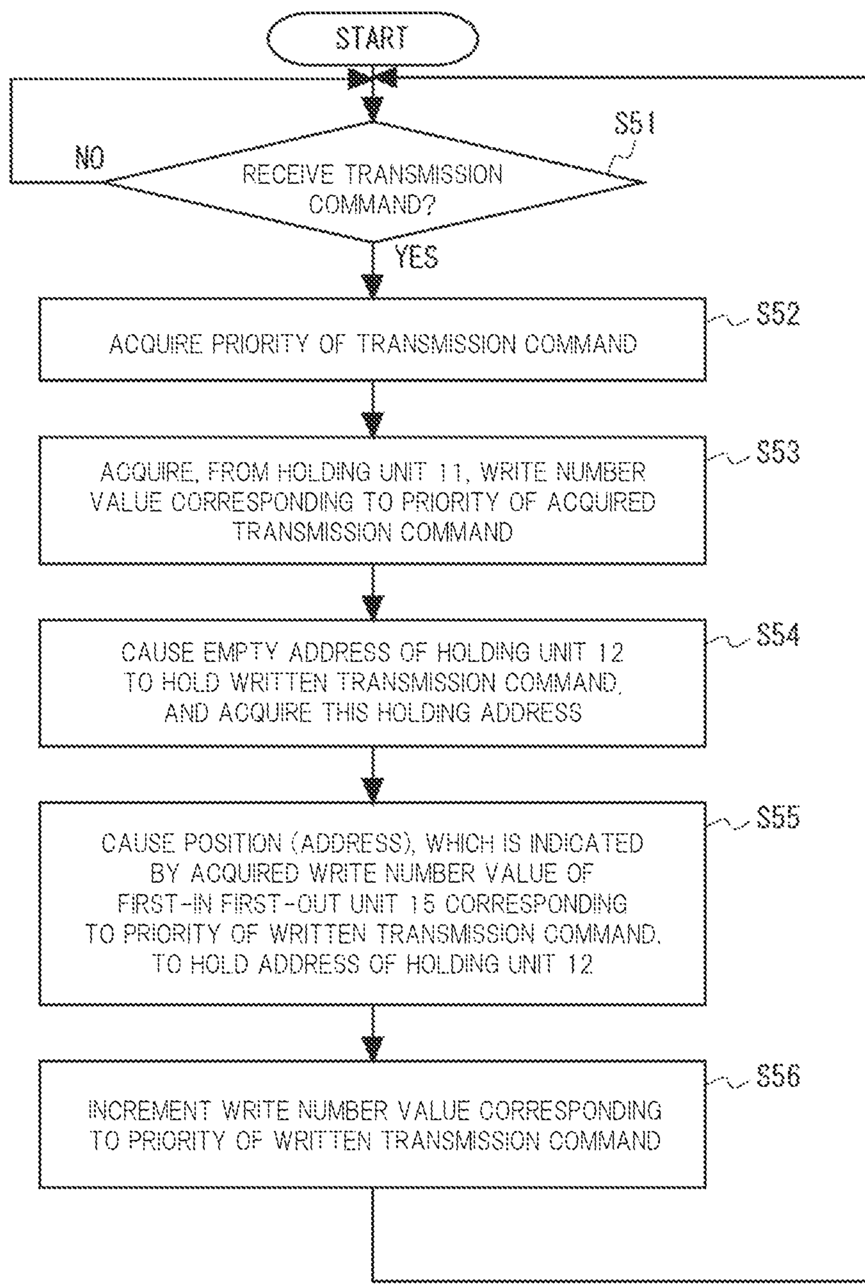
FIG. 16 is a flowchart showing a write processing of a transmission command of the buffering device according to the fourth embodiment.
Figure 17:
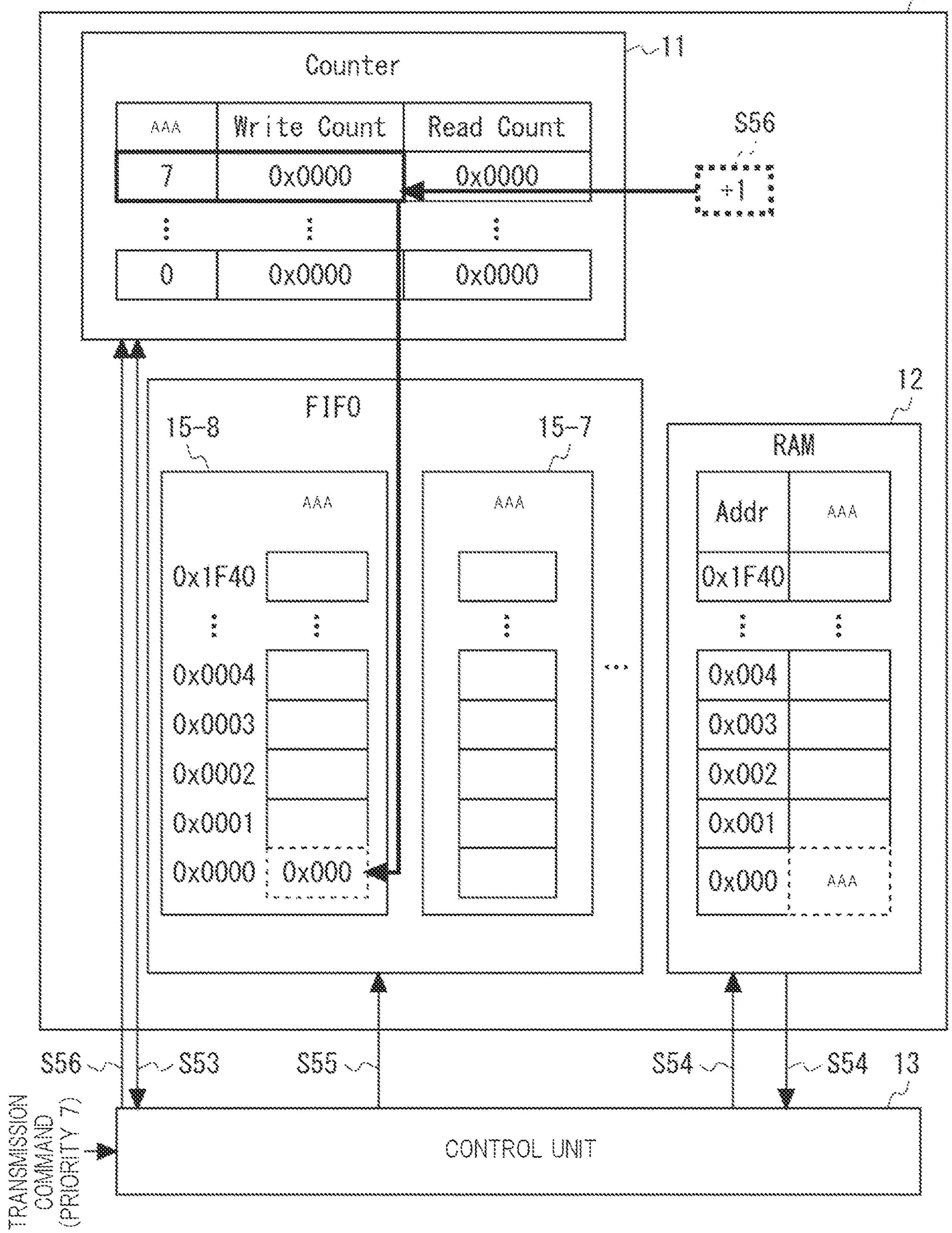
FIG. 17 is a diagram for explaining the write processing of the transmission command of the buffering device according to the fourth embodiment.

FIG. 16 is a flowchart showing a write processing of the transmission command of the buffering device according to the fourth embodiment. FIG. 17 is a diagram for explaining the write processing of the transmission command of the buffering device according to the fourth embodiment. Incidentally, the control unit 13 executes a processing flow of FIG. 16 for each destination port. Further, in an example of FIG. 17, the holding unit 11 is the counter and the holding unit 12 is the RAM.

The control unit 13 waits to receive the transmission command corresponding to the processed destination port (step S51 NO). When receiving the transmission command corresponding to the processed destination port (step S51 YES), the control unit 13 acquires the priority of the transmission command (step S52). Incidentally, the information on the priority of the transmission command may be included in the transmission command. In the example of FIG. 17, priority 7 of the transmission command is acquired.

The control unit 13 acquires the write number value (Write Count), which corresponds to the acquired priority of the transmission command, from the holding unit 11 (step S53). Here, since no transmission command having any priority is held, the write number value becomes "0x0000".

The control unit 13 causes the empty address of the holding unit 12 to hold the written transmission command, and acquires this holding address (step S54). In the example of FIG. 17, the address "0x000" of the holding unit 12 is acquired.

The control unit 13 causes the position (address), which the acquired write number value of the first-in first-out unit 15 corresponding to the priority of the written transmission command indicates, to hold the acquired address of the holding unit 12 (step S55). In the example of FIG. 17, the address "0x000" of the holding unit 12 is held at the address "0x0000" of the first-in first-out unit 15-8 corresponding to priority 7.

The control unit 13 increments the write number value corresponding to the priority of the written transmission command in the holding unit 11 (step S56). In the example of FIG. 17, a value of Write Count corresponding to the priority 7 is incremented, thereby being updated from "0x0000" to "0x0001".

Read Processing of Transmission Command

Figure 18:
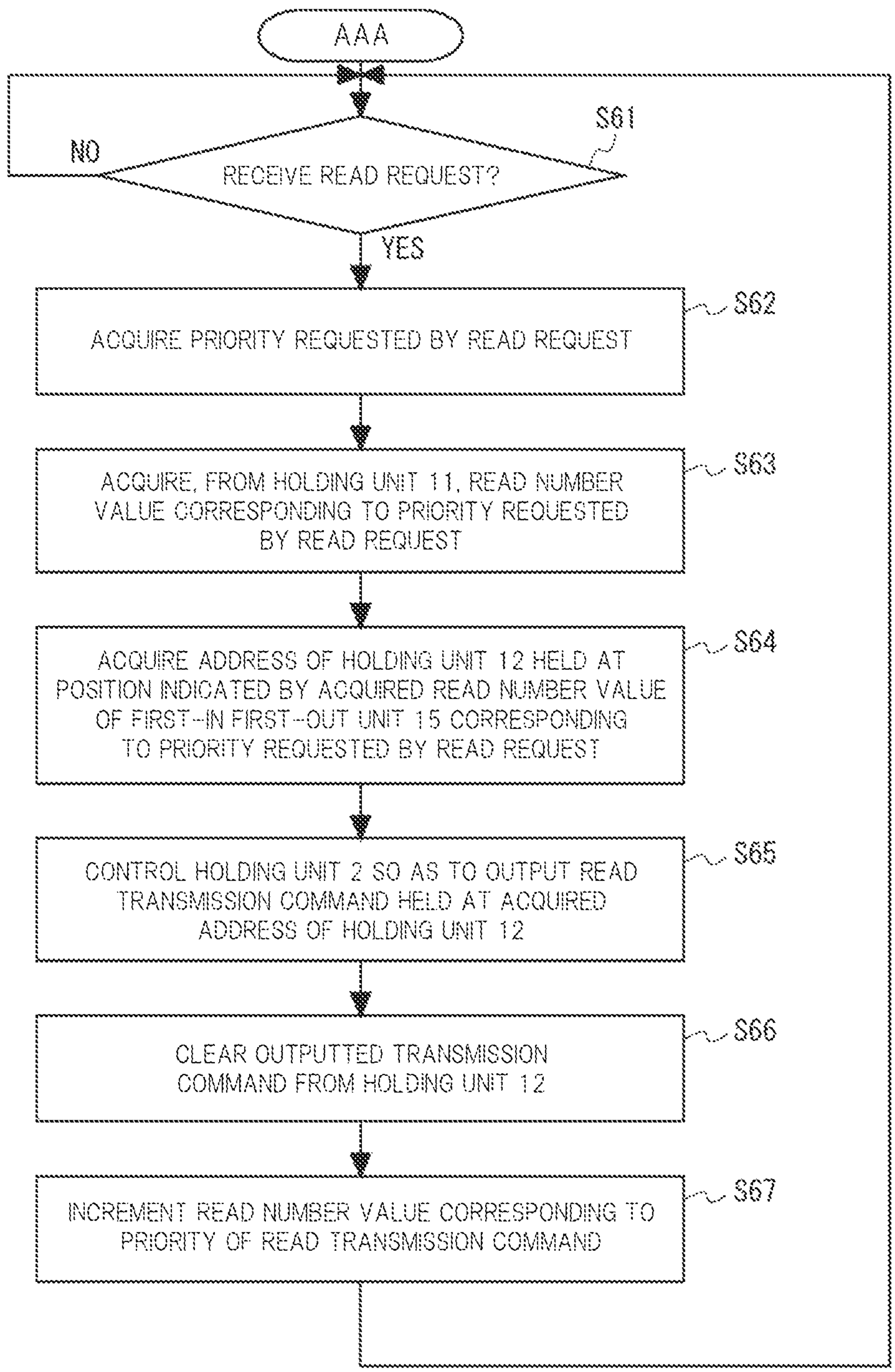
FIG. 18 is a flowchart showing a read processing of the transmission command of the buffering device according to the fourth embodiment.
Figure 19:
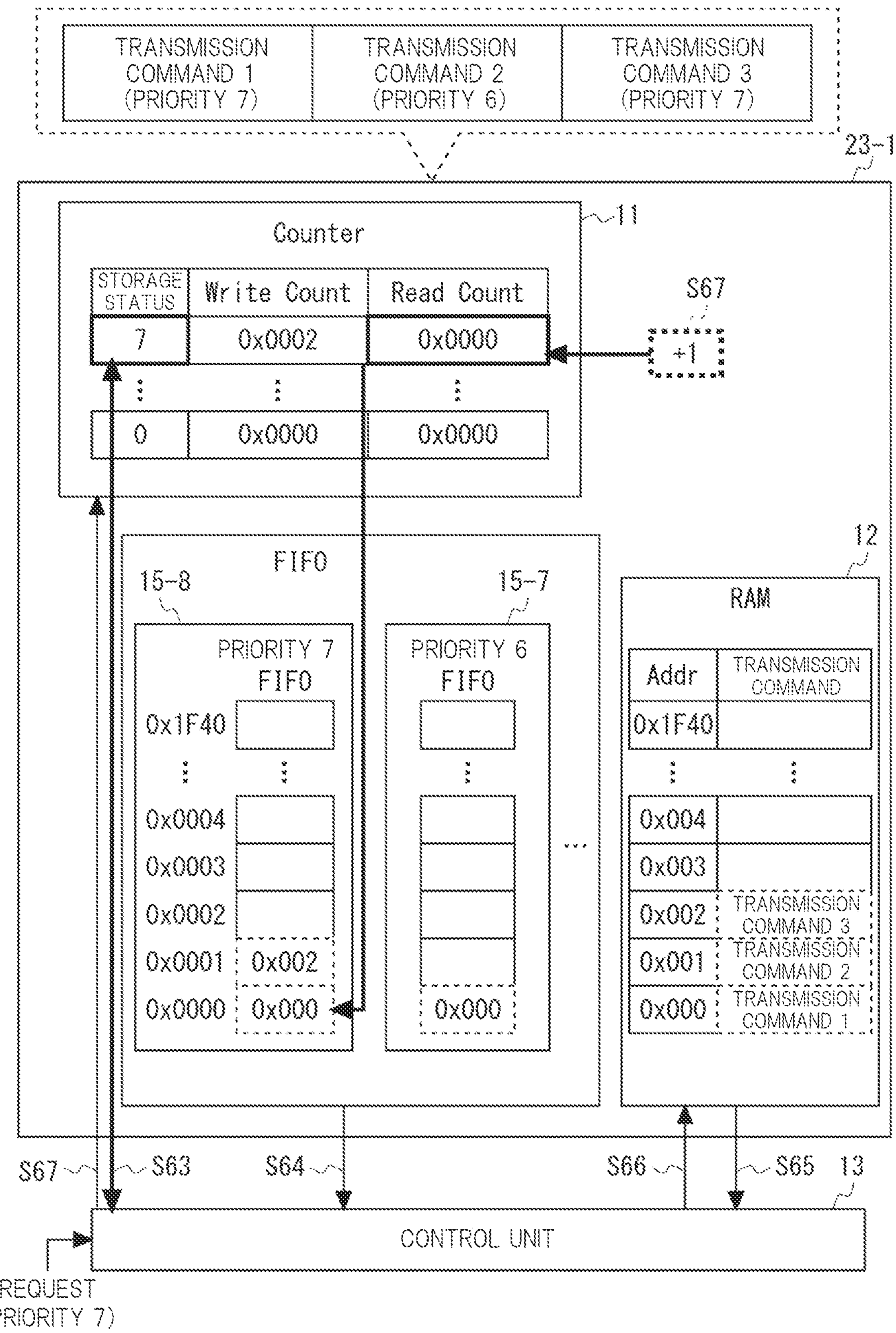
FIG. 19 is a diagram for explaining the read processing of the transmission command of the buffering device according to the fourth embodiment.

FIG. 18 is a flowchart showing a read processing of the transmission command of the buffering device according to the fourth embodiment. FIG. 19 is a diagram for explaining the read processing of the transmission command of the buffering device according to the fourth embodiment. Incidentally, the control unit 13 executes a processing flow of FIG. 18 for each destination port. Also, in an example of FIG. 19, the holding unit 11 is the counter and the holding unit 12 is the RAM.

The control unit 13 waits to receive the read request corresponding to the processed destination port (step S61 NO). When receiving the read request corresponding to the processed destination port (step S61 YES), the control unit 13 acquires the priority requested by the read request (step S62). Incidentally, the information on the priority requested by the read request may be included in the read request.

The control unit 13 acquires the read number value (Read Count), which corresponds to the priority requested by the read request, from the holding unit 11 (step S63).

The control unit 13 acquires the address of the holding unit 12 held at the position which the acquired read number value of the first-in first-out unit 15 corresponding to the priority requested by the read request indicates (step S64).

The control unit 13 controls the holding unit 12 so as to output the read transmission command held at the acquired address of the holding unit 12 (step S65).

The control unit 13 clears the outputted transmission command from the holding unit 12 (step S66).

The control unit 13 increments the read number value corresponding to the priority of the read transmission command in the holding unit 11 (step S67).

Modification Example of Fourth Embodiment

In the first embodiment described above, the "grouping criterion" is the priority. In contrast, in the modification example of the first embodiment, the "grouping criteria" are the priority and the destination port.

Figure 20:
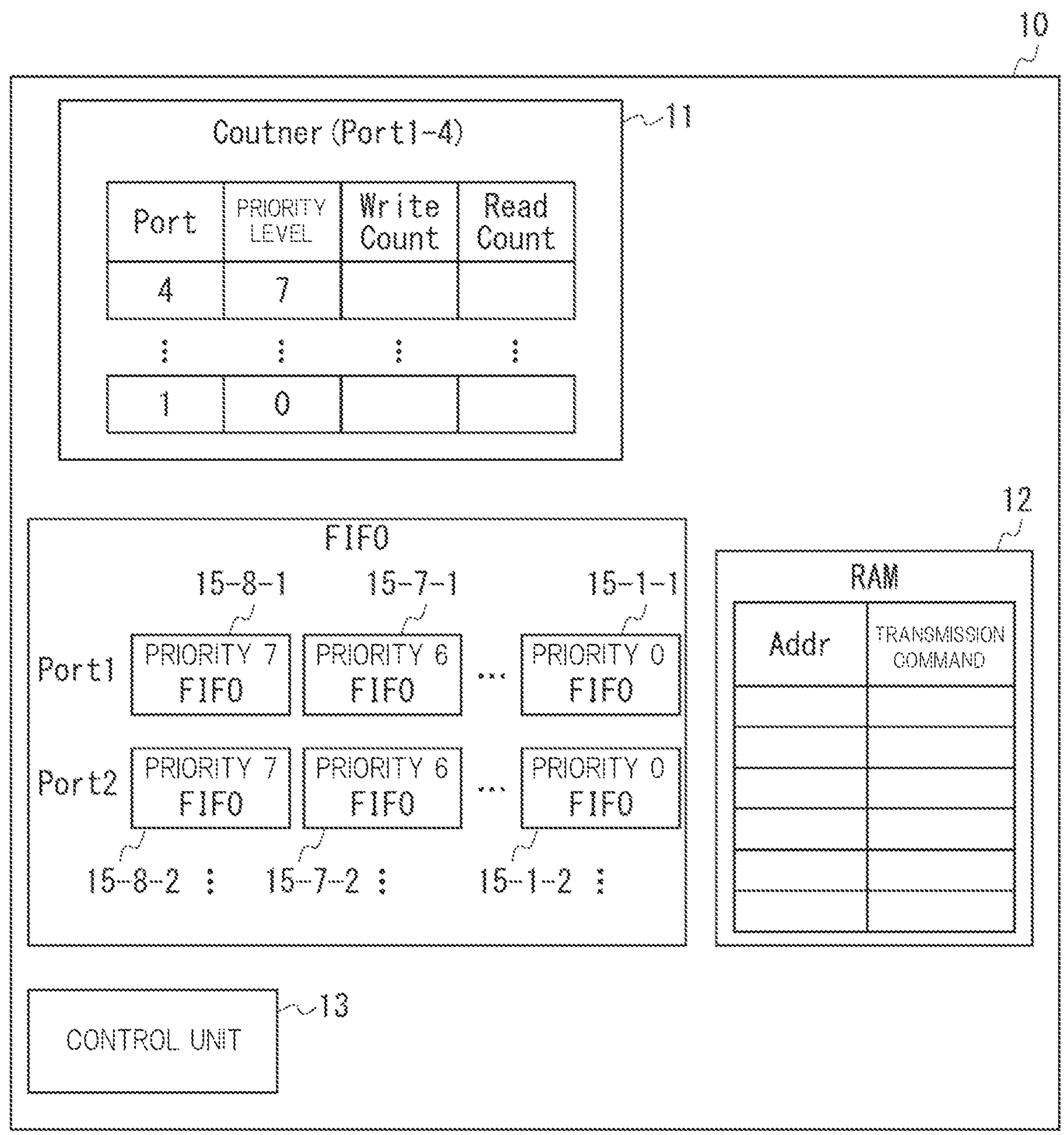
FIG. 20 is a block diagram showing one example of a buffering device according to a modification example of the fourth embodiment.

FIG. 20 is a block diagram showing one example of a buffering device according to a modification example of the fourth embodiment. In FIG. 20, the buffering device 10 has the holding unit 11, the holding unit 12, first-in first-out units 15-1-1 to 15-8-1, 15-1-2 to 15-8-2, 15-1-3 to 15-8-3, and 15-1-4 to 15-8-4. The first-in first-out units 15-1-1 to 15-8-1 correspond to priority 0 to 7 of the destination port 1, respectively. Also, the first-in first-out units 15-1-2 to 15-8-2 correspond to priority 0 to 7 of the destination port 2, respectively. Further, the first-in first-out units 15-1-3 to 15-8-3 correspond to priority 0 to 7 of the destination port 3, respectively. In addition, the first-in first-out units 15-1-4 to 15-8-4 correspond to priority 0 to 7 of the destination port 4, respectively.

The holding unit 11 holds the write number value and the read number value for each of the plurality of combinations of the priorities and the destination ports. In the holding unit 11 of the modification example of the fourth embodiment, for example, the address itself in the first-in first-out unit 15 corresponding to the priority and the destination port is used with respect to each of the write number value and the read number value for a certain combination of the priority and the destination port.

The holding unit 12 holds all of the transmission commands corresponding to the frames regardless of the combination of the priority and the destination port.

When causing the holding unit 12 to hold the written transmission command, the control unit 13 acquires the write value corresponding to the priority and the number destination port of the written transmission command in the holding unit 11. Then, the control unit 13 causes the empty address of the holding unit 12 to hold the written transmission command, and acquires this holding address. Then, the control unit 13 causes the position (address), which the acquired write number value of the first-in first-out unit 15 corresponding to the priority and the destination port of the written transmission command indicates, to hold the acquired address of the holding unit 12. Then, the control unit 13 increments the write number value corresponding to the priority and the destination port of the written transmission command in the holding unit 11.

In addition, when causing the holding unit 12 to output the read transmission command, the control unit 13 acquires the read number value corresponding to the priority and the destination port of the read transmission command in the holding unit 11. Then, the control unit 13 causes the address of the holding unit 12 held at the position which the acquired read number value of the first-in, first-out unit 15 corresponding to the priority and the destination port of the read transmission command indicates. Then, the control unit 13 controls the holding unit 12 so as to output the read transmission command held at the acquired address of the holding unit 12. Then, the control unit 13 clears the outputted transmission command from the holding unit 12. Then, the control unit 13 increments the read number value corresponding to the priority and the destination port of the read transmission command in the holding unit 11.

Fifth Embodiment

A fifth embodiment relates to an embodiment which, by associating the transmission command with the priority and the number value of the transmission command in each entry of a table, manages the transmission command. Incidentally, since a basic configuration of a buffering device according to a fifth embodiment is the same as the basic configuration of the buffering device 10 according to the second embodiment, FIG. 8 will be referred to.

Figure 21:
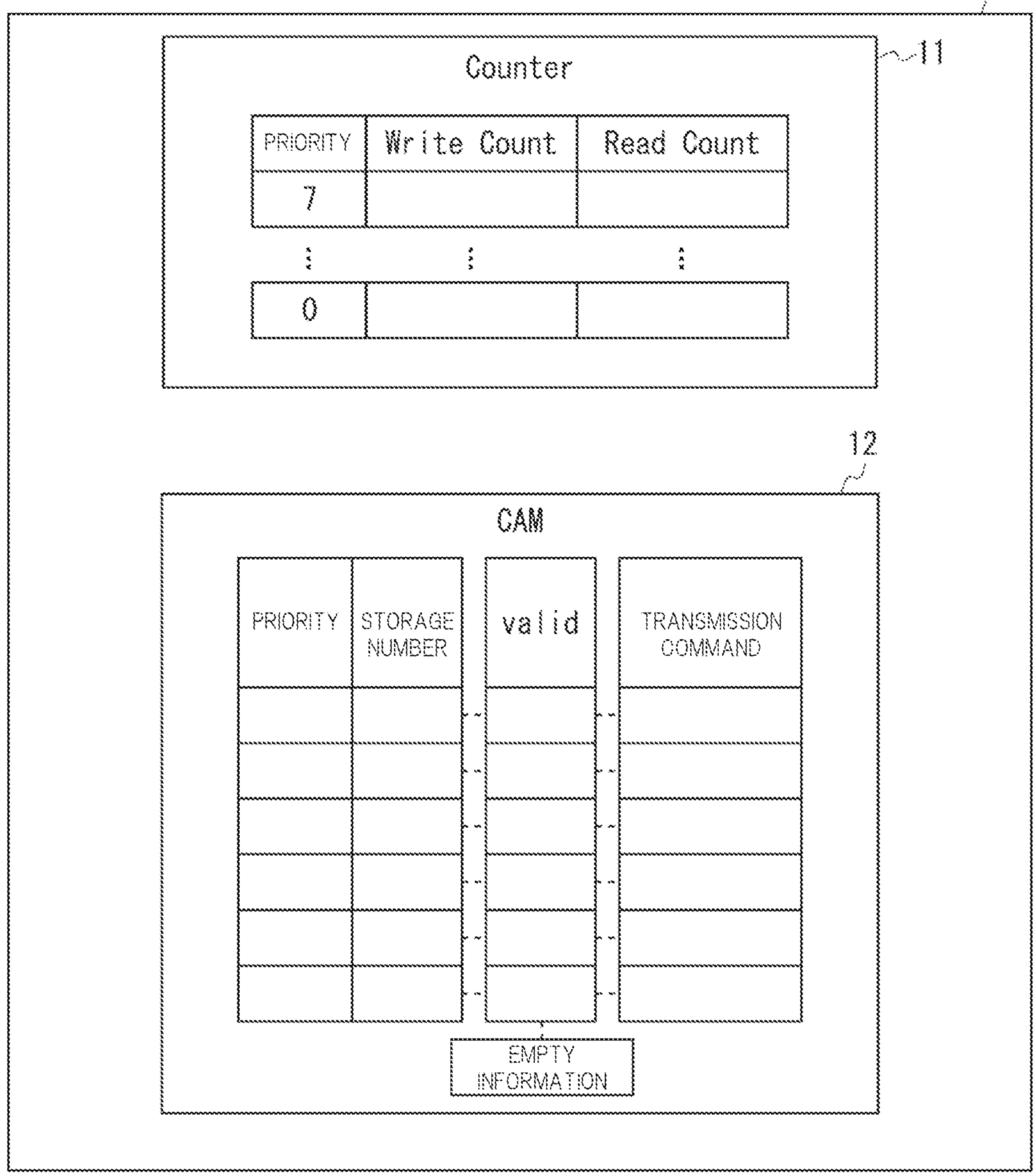
FIG. 21 is a diagram for explaining configurations of a first holding unit and a second holding unit in a fifth embodiment.

FIG. 21 is a diagram for explaining configurations of a first holding portion and a second holding portion in the fifth embodiment. As shown in FIG. 21, the holding unit 11 of the fifth embodiment is the same as the holding unit 11 of the second embodiment.

The holding unit 12 of the fifth embodiment holds a table including the plurality of entries. Each entry associates the transmission command with the priority and the number (storage number) value of the above-mentioned transmission command, and holds them. Also, each entry may have the "occupancy information (empty information)".

When receiving the written transmission command, the control unit 13 of the fifth embodiment performs the processing for the processing buffering unit 21 corresponding to the destination port of this transmission command (namely, the destination port of the frame corresponding to the transmission command). Further, the control unit 13 performs the processing for the buffering processing unit 21 corresponding to the destination port of the read transmission command (namely, the destination port of the frame corresponding to the transmission command).

For example, when receiving the written transmission command for the destination port #1, the control unit 13 performs the processing for the buffering processing unit 21-1. For example, when receiving the written transmission command, the control unit 13 acquires the priority of the written transmission command. Then, the control unit 13 acquires the write number value, which corresponds to the acquired priority of the transmission command, from the holding unit 11. Then, the control unit 13 adds, to the table of the holding unit 12, the entry that associates the written transmission command with the priority and the number value of the above-mentioned transmission command. Also, the control unit 13 may change the value of the occupation information of the entry from "0" to "1". Then, the control unit 13 increments the write number value corresponding to the priority of the transmission command in the holding unit 11.

Also, for example, when receiving the read request for the destination port #1, the control unit 13 performs the processing for the buffering processing unit 21-1. For example, when causing the holding unit 12 to output the read transmission command, the control unit 13 acquires the priority of the read transmission command. Then, the control unit 13 acquires, from the holding unit 11, the read number value corresponding to the priority of the read transmission command. Then, the control unit 13 controls the holding unit 12 so that the holding unit 12 outputs the transmission command of the entry corresponding to the priority and the number value of the read transmission instruction. Also, the control unit 13 may change the value of the occupation information of the entry from "1" to "0". Then, the control unit 13 increments the read number value corresponding to the priority of the transmission command in the holding unit 11.

Modification Example of Fifth Embodiment

In the fifth embodiment described above, the "grouping criterion" is the priority. In contrast, in a modification example of the fifth embodiment, the "grouping criteria" are the priority and the destination port.

Figure 22:
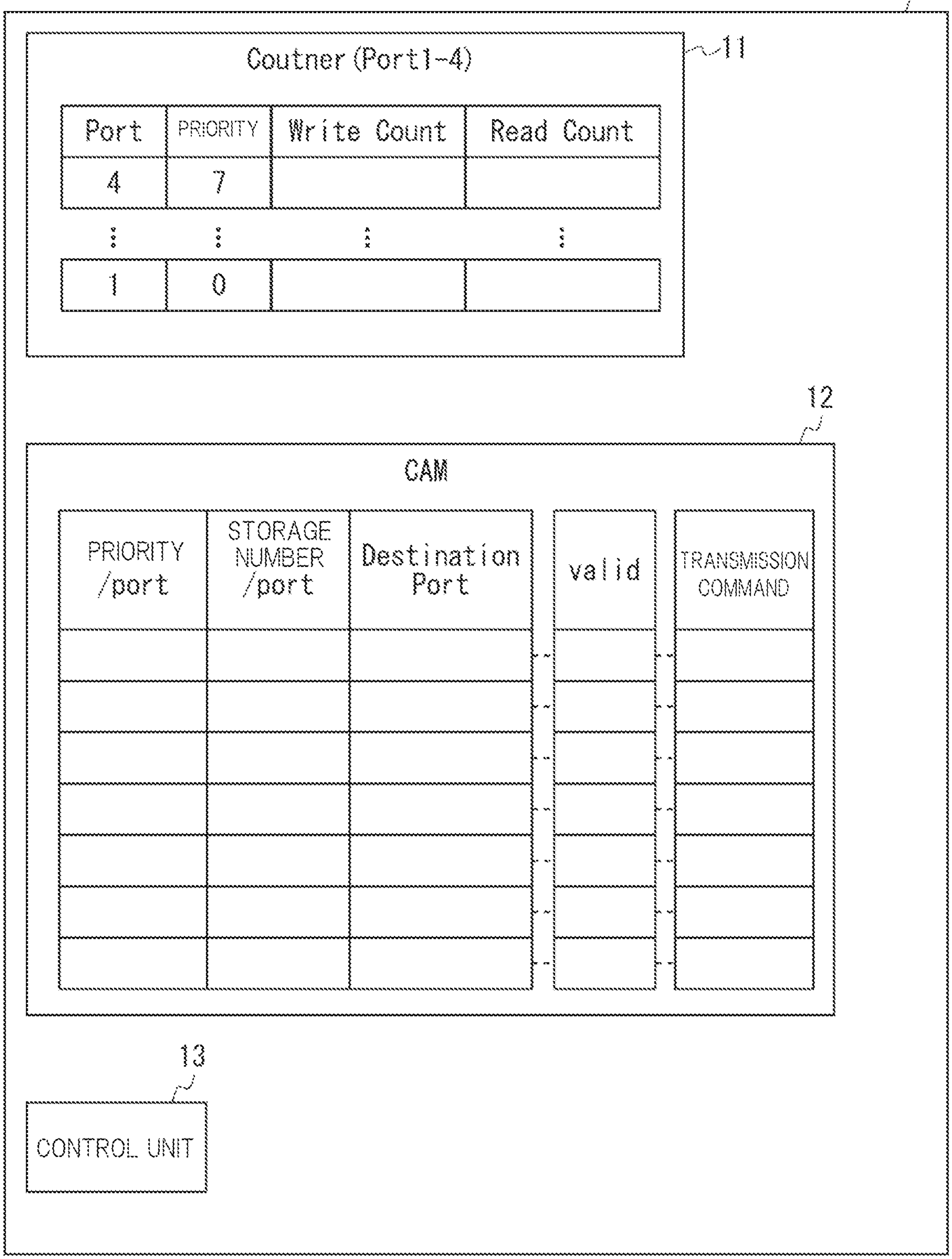
FIG. 22 is a block diagram showing one example of a buffering device according to a modification example of the fifth embodiment.

FIG. 22 is a block diagram showing one example of a buffering device according to a modification example of a fifth embodiment. In FIG. 22, the buffering device 10 has the holding unit 11, the holding unit 12, and the control unit 13.

As in the modification example of the second embodiment, the holding unit 11 of the modification example of the fifth embodiment holds the write number value and the read number value for each of the plurality of combinations of the priorities and the destination ports.

The holding unit 12 of the modification example of the fifth embodiment holds the table including the plurality of entries. Each entry associates the transmission command with the priority, the destination port, and the number (storage number) value of the above-mentioned transmission command, and holds them. Also, each entry may have the "occupancy information (empty information)".

When receiving the written transmission command, the control unit 13 acquires the priority and the destination port of the written transmission command. Then, the control unit 13 acquires the write number value, which corresponds to the acquired priority and destination port of the transmission command, from the holding unit 11. Then, the control unit 13 adds, to the table of the holding unit 12, the entry that associates the written transmission command with the priority, the destination port, and the number value of that transmission command. Also, the control unit 13 may change the value of the occupation information of the entry from "0" to "1". Then, the control unit 13 increments the write number value corresponding to the priority of the transmission command in the holding unit 11.

Also, when causing the holding unit 12 to output the read transmission command, the control unit 13 acquires the priority and the destination port of the read transmission command. Then, the control unit 13 acquires, from the holding unit 11, the read number value corresponding to the priority and the destination port of the read transmission command. Then, the control unit 13 controls the holding unit 12 so that the holding unit 12 outputs the transmission command of the entry corresponding to the priority, the destination port, and the number value of the read transmission command. Also, the control unit 13 may change the value of the occupation information of the entry from "1" to "0". Then, the control unit 13 increments the read number value corresponding to the priority and the destination port of the transmission command in the holding unit 11.

The invention made by the present inventors has been specifically described above based on the embodiments, but the present invention is not limited to the embodiments already described and, needless to say, can be variously modified without departing from the scope of the invention.

What is claimed is:

1. A buffering device of transmission commands, comprising:

a counter storing information on a write number and information on a read number for each pair of a priority of the transmission commands and a destination port of the transmission commands;

a first memory share among the plurality of a plurality of priorities, the first memory storing at least one of the transmission commands based only on the destination port of each transmission command, excluding the priority; and a central processing unit (CPU) forming a storage address causing the first memory to store a written transmission command based on the destination port of the written transmission command, and forming an output address of the first memory, in which a read transmission command is stored, based on the destination port of the read transmission command, wherein the CPU forms the storage address and the output address based on the information on the write number and the information on the read number, respectively, for the priority and the destination port corresponding to the written transmission command and the read transmission command, in the counter.

2. The buffering device according to claim 1, further comprising a second memory storing correspondence information that associates an address of the first memory storing each of the transmission commands with the priority, the destination port, and a number value of each of the transmission commands, wherein the CPU:

when causing the first memory to store the written transmission commands, adds an entry, which associates the address of the first memory, the priority, the destination port, and the number value corresponding to the written transmission command, to the correspondence information;

increments the information on the write number corresponding to the priority and the destination port of the written transmission commands in the counter;

when causing the first memory to output the read transmission commands, specifies, as the output address, the address of the first memory in the entry of the correspondence information corresponding to the priority, the destination port, and the number value of the read transmission commands; and increments information on the read number corresponding to the priority and the destination port of the read transmission commands in the counter.

3. The buffering device according to claim 1, wherein the buffering device includes a second memory storing correspondence information that associates an address of the first memory storing each of the transmission commands with the priority, the destination port, and the number value of each of the transmission commands, and wherein the CPU:

when causing the first memory to store the written transmission commands, adds an entry, which associates the address of the first memory, the priority, the destination port, and the number value of the written transmission commands, to the correspondence information; and increments the information on the write number corresponding to the priority and the destination port of the written transmission commands in the counter;

when causing the first memory to output the read transmission commands, specifies, as the output address, the address of the first memory in the entry of the correspondence information corresponding to the priority, the destination port, and the number value of the read transmission commands; and increments the information on the read number corresponding to the priority and the destination port of the read transmission commands in the counter.

4. The buffering device according to claim 1, wherein the CPU:

when causing the first memory to store the written transmission commands, calculates a hash value as the storage address based on the priority and the number value of the written transmission commands;

increments the information on the write number corresponding to the priority and the destination port of the written transmission commands in the counter;

when causing first memory to output the read transmission commands, calculates a hash value as the output address based on the priority and the number value of the read transmission commands;

increments the information on the read number corresponding to the priority and the destination port of the read transmission commands in the counter.

5. The buffering device according to claim 1, wherein the CPU:

when causing the first memory to store the written transmission commands, calculates a hash value as the storage address based on the priority, the destination port, and the number value of the written transmission commands;

increments the information on the read number corresponding to the priority and the destination port of the written transmission commands in the counter;

when causing the first memory to output the read transmission commands, calculates a hash value as the output address based on the priority, the destination port, and the number value of the read transmission commands; and increments the information on the read number corresponding to the priority and the destination port of the read transmission commands in the counter.

6. The buffering device according to claim 1, further comprising a second memory storing correspondence information including at least one of entries, each of the entries associating an address of the first memory, occupancy information indicating whether the transmission commands are stored at the address of the first memory or a reservation is made, and a next address, which is an address of the first memory storing a transmission command subsequent to the transmission commands stored at the current address with respect to the priority of the transmission commands, wherein the CPU:

when causing the first memory to store the written transmission commands, causes the address of the first memory, which is based on the information on the write number corresponding to the priority of the written transmission commands, to store the written transmission commands;

acquires an unused address of the first memory, at which no transmission command is stored and no reservation is made, from the correspondence information;

inputs the acquired unused address to the next address in the entry of the correspondence information corresponding to the address of the first memory storing the written transmission commands;

updates, to a value indicating whether the transmission commands are stored or the reservation is made, the occupation information in the entry of the correspondence information corresponding to the acquired unused address;

updates, using the acquired unused address, the information on the read number corresponding to the priority of the read transmission commands in the counter;

when causing the first memory to output the read transmission commands, causes the first memory to output the read transmission commands from the address of the first memory based on the information on the read number; and updates the information on the read number corresponding to the priority of the read transmission commands using the next address in the entry of the correspondence information corresponding to the address of the first memory of the outputted read transmission commands.

7. The buffering device according to claim 1, wherein the buffering device includes a second memory storing correspondence information including at least one of entries, each of the entries associating an address of the first memory, occupation information indicating whether the transmission commands are stored at the address of the first memory or a reservation is made, and a next address, which is the address of the first memory storing a transmission command subsequent to the transmission commands stored at the current address with respect to the priority of the transmission commands, and wherein the CPU:

when causing the first memory to store the written transmission commands, causes the address of the first memory, determined based on the information on the write number corresponding to the priority and the destination port of the written transmission commands, to store the written transmission commands;

acquires an unused address of the first memory, at which no transmission commands are stored and no reservation is made, from the correspondence information;

inputs the acquired unused address to the next address in the entry of the correspondence information corresponding to the address of the first memory storing the written transmission commands;

updates, as a value indicating whether the transmission commands are stored or the reservation is made, the occupation information in the entry of the correspondence information corresponding to the acquired unused address;

updates, using the acquired unused address, information on the read number corresponding to the priority and the destination port of the read transmission commands in the counter;

when causing the first memory to output the read transmission commands, causes the first memory to output the read transmission commands from the address of the first memory determined based on the information on the read number corresponding to the priority and the destination port of the read transmission commands; and updates the information on the read number, which corresponds to the priority and the destination port of the read transmission commands, using the next address in the entry of the correspondence information corresponding to the address of the first memory from which the read transmission commands was output.

8. The buffering device according to claim 1, further comprising a plurality of first-in first-out units, wherein each of the first-in first-out units corresponds to the priority of the transmission commands, and wherein the CPU:

when causing the first memory to store the written transmission commands, causes a position, which is indicated by the information on the write number in the first-in first-out units corresponding to the priority of the written transmission commands, to store an address of the first memory storing the written transmission commands;

increments the information on the write number corresponding to the priority of the written transmission commands in the counter;

when causing the first memory to output the read transmission commands, causes the first memory to output the read transmission commands from the address of the first memory stored at the position indicated by the information on the read number of the first-in first-out units corresponding to the priority of the read transmission commands; and increments the information on the read number corresponding to the priority of the read transmission commands in the counter.

9. The buffering device according to claim 1, further comprising a plurality of first-in first-out units, wherein each of the first-in first-out units corresponds to the priority and the destination port of the transmission commands, and wherein the CPU:

when causing the first memory to store the written transmission commands, causes a position, which is indicated by the information on the write number in the first-in first-out units corresponding to the priority and the destination port of the written transmission commands, to store an address of the first memory storing the written transmission commands;

increments the information on the write number corresponding to the priority and the destination port of the written transmission commands in the counter;

when causing the first memory to output the read transmission commands, causes the first memory to output the read transmission commands from the address of the first memory stored at the position indicated by the information on the read number of the first-in first-out units corresponding to the priority and the destination port of the read transmission commands; and increments the information on the read number corresponding to the priority and the destination port of the read transmission commands in the counter.

10. The buffering device according to claim 1, wherein the first memory stores a table including at least one of entries, each of the entries associating the transmission commands with the priority and a number value of the transmission commands, and wherein the CPU:

when causing the table to store the written transmission commands, adds the entry, which associates the written transmission commands with the priority and the number value of the written transmission commands, to the table;

increments the information on the write number corresponding to the priority of the written transmission commands in the counter;

when causing the first memory to output the read transmission commands, causes the first memory to output the transmission commands associated with the priority and the number value of the read transmission commands in the table; and increments the information on the read number corresponding to the priority of the written transmission commands in the counter.

11. The buffering device according to claim 1, wherein the first memory stores a table including at least one of entries, each of the entries associating the transmission commands with the priority, the destination port, and the number value of the transmission commands, and wherein the CPU:

when causing the table to store the written transmission commands, adds the entry, which associates the written data units with the priority, the destination port, and the number value of the written transmission commands, to the table;

increments information on the write number corresponding to the priority and the destination port of the written transmission commands in the counter;

when causing the first memory to output the read transmission commands, causes the first memory to output the transmission commands associated with the priority, the destination port, and the number value of the read transmission commands in the table; and increments the information on the read number corresponding to the priority and the destination port of the written transmission commands in the counter.

12. The buffering device according to claim 1, further comprising a second memory storing correspondence information including at least one of entries, each of the entries associating the address of the first memory, occupancy information indicating whether the transmission commands are stored at the address of the first memory, and the priority and the number value stored at the address of the first memory, wherein the CPU:

when the first memory to store the written transmission commands, acquires one address of the first memory, which is associated with the occupancy information indicating no transmission commands are stored, from the correspondence information;

stores the written transmission command at the acquired one address of the first memory;

inputs the priority and the number value of the written transmission commands to the entry corresponding to the acquired one address;

updates the occupancy information of the entry corresponding to the acquired one address to indicate that a transmission command is stored;

increments the information on the write number corresponding to the priority of the written transmission commands in the counter;

when causing the first memory to output the read transmission commands, causes the first memory to output the read transmission commands from the address of the first memory identified in the entry of the correspondence information corresponding to the priority and the number value of the read transmission commands;

updates the occupancy information of the entry of the correspondence information corresponding to the priority and the number value of the read transmission commands to indicate that no transmission commands are stored; and increments the information on the read number corresponding to the priority and the destination port of the read transmission commands in the counter.

13. The buffering device according to claim 2, wherein the second memory is realized by a CAM (Content Addressable Memory).

14. The buffering device according to claim 10, wherein the first memory is realized by a CAM (Content Addressable Memory).

15. A control method executed by a buffering device of transmission commands, the control method comprising:

storing, in a counter, information on a write number and information on a read number for each pair of a priority and a destination port of the transmission commands;

storing at least one of the transmission commands in a first memory shared among a plurality of priorities, and storing, in the first memory, the transmission commands based only on the destination port of each transmission command, excluding the priority;

forming, using a central processing unit (CPU), a storage address, which causes the first memory to store the written transmission commands, based on the information on the write number corresponding to the priority and the destination port of the written transmission commands; and forming, using the CPU, an output address of the first memory, in which the read transmission commands are stored, based on the information on the read number corresponding to the priority and the destination port of the read transmission commands.

16. The control method according to claim 15, further comprising:

storing, in a second memory, correspondence information associating an address of the first memory with the priority, the destination port, and a number value of each of the transmission commands, each of the transmission commands being stored in the first memory;

when causing the first memory to store the written transmission commands, adding an entry, which associates the address of the first memory, the priority, the destination port, and the number value of the written transmission commands, to the correspondence information;

incrementing the information on the write number corresponding to the priority and the destination port of the written transmission commands in the counter;

when causing the first memory to output the read transmission commands, specifying, as the output address, the address of the first memory in the entry of the correspondence information corresponding to the priority, the destination port, and the number value of the read transmission commands; and incrementing the information on the read number corresponding to the priority of the read transmission commands in the counter.

17. The control method according to claim 15, wherein the control method includes:

storing, in a second memory, correspondence information associating the address of the first memory, in which each of the transmission commands is stored, with the priority, the destination port, and the number value for each of the transmission commands;

when causing the first memory to store the written transmission commands, adding, to the correspondence information, the entry associating the address of the first memory, the priority, the destination port, and the number value of the written transmission commands;

incrementing the information on the write number corresponding to the priority and destination port of the written transmission commands in the counter;

when causing the first memory to output the read transmission commands, specifying, as the output address, the address of the first memory in the entry of the correspondence information corresponding to the priority, the destination port, and the number value of the read transmission commands; and incrementing the information on the read number corresponding to the priority and the destination port of the read transmission commands in the counter.

18. A non-transitory computer readable storage medium causing to a buffering device of transmission commands to perform a processing, the non-transitory computer readable storage medium comprising:

storing, in a counter, information on a write number and information on a read number for each pair of a priority and a destination port of the transmission commands;

storing at least one of the transmission commands in a first memory shared among a plurality of priorities, and storing the transmission commands based only on the destination port of each transmission command, excluding the priority;

forming, using a central processing unit (CPU), a storage address, which causes the first memory to store the written transmission commands, based on information on a write number for the grouping criteria corresponding to the written transmission commands; and forming, using the CPU, an output address of the first memory, in which the read transmission commands are stored, based on the information on the read number corresponding to the priority and the destination port of the read transmission commands.

19. The non-transitory computer readable storage medium according to claim 18, wherein the processing includes:

storing, in a second memory, correspondence information that associates the address of the first memory with the priority, the destination port, and a number value of each of transmission commands, each of the transmission commands being stored in the first memory;

when causing the first memory to store the written transmission commands, adding, to the correspondence information, an entry which associates the address of the first memory, the priority, the destination port, and the number value of the written transmission commands;

incrementing information on a write number corresponding to the priority and the destination port of the written transmission commands in the counter;

when causing the first memory to output the read transmission commands, specifying, as the output address, the address of the first memory in the entry of the correspondence information corresponding to the priority, the destination port, and the number value of the read transmission commands; and incrementing the information on the read number corresponding to the priority of the read transmission commands in the counter.

20. The non-transitory computer readable storage medium according to claim 18, wherein the processing includes:

storing, in a second memory, the correspondence information associating the address of the first memory, in which each of the transmission commands is stored, with the priority, the destination port, and the number value for each of the transmission commands;

when causing the first memory to store the written transmission commands, adding an entry, which associates the address of the first memory, the priority, the destination port, and the number value of the written transmission commands, to the correspondence information;

incrementing the information on the write number corresponding to the priority and the destination port of the written transmission commands in the counter;

when causing the first memory to output the read transmission commands, specifying, as the output address, the address of the first memory in the entry of the correspondence information corresponding to the priority, the destination port, and the number value of the read transmission commands; and incrementing the information on the read number corresponding to the priority and the destination port of the read transmission commands in the counter.

* * * * *